US010891868B1

(12) United States Patent
Parodi

(10) Patent No.: US 10,891,868 B1
(45) Date of Patent: Jan. 12, 2021

(54) EFFICIENT FLIGHT OPERATIONS BASED ON NATURALLY PRESENT ENERGY SOURCES OR SINKS

(71) Applicant: Amazon Technologies, Inc., Seattle, WA (US)

(72) Inventor: Carlos Guillermo Parodi, Issaquah, WA (US)

(73) Assignee: Amazon Technologies, Inc., Seattle, WA (US)

(*) Notice: Subject to any disclaimer, the term of this patent is extended or adjusted under 35 U.S.C. 154(b) by 188 days.

(21) Appl. No.: 16/138,902

(22) Filed: Sep. 21, 2018

(51) Int. Cl.
*G08G 5/00* (2006.01)
*B64C 39/02* (2006.01)

(52) U.S. Cl.
CPC .......... *G08G 5/0034* (2013.01); *B64C 39/024* (2013.01); *B64C 2201/027* (2013.01); *B64C 2201/123* (2013.01); *B64C 2201/126* (2013.01); *B64C 2201/128* (2013.01)

(58) Field of Classification Search
CPC ............ G08G 5/0034; B64C 2201/123; B64C 2201/027; B64C 2201/00; B64C 2201/06; B64C 2201/127
See application file for complete search history.

(56) References Cited

U.S. PATENT DOCUMENTS

| 2016/0363696 | A1* | 12/2016 | Dao | G01W 1/10 |
| 2018/0292817 | A1* | 10/2018 | Yang | G08G 5/0013 |
| 2019/0271563 | A1* | 9/2019 | Pandit | G01C 21/20 |

OTHER PUBLICATIONS

Martin, Nicholas, AI could help drones ride air currents like birds, Sep. 20, 2018, The Conversation, pp. 1-7 (Year: 2018).*
Andersson et al., Cooperating UAVs Using Thermal Lift to Extend Endurance, Apr. 2009, American Institute of Aeronautics and Astronautics, All (Year: 2009).*

* cited by examiner

*Primary Examiner* — Alan D Hutchinson
*Assistant Examiner* — Andy Schneider
(74) *Attorney, Agent, or Firm* — Athorus, PLLC

(57) ABSTRACT

Changes in energy of an aerial vehicle that are unrelated to any operational changes in the aerial vehicle may be associated with energy sources or sinks naturally present at a location. Air flows generated due to contrasts in surface temperatures or terrain features at locations may cause energy levels of aerial vehicles to rise or fall. Locations of changes in energy may be recorded and used to generate a map or other representation of energy within an area. The map or other representation may be used in selecting optimal routes for aerial vehicles within the area. Additionally, a machine learning system may be trained using maps or representations of energy within areas and images of such areas. An image of an area may be provided to a trained machine learning system as an input, and a representation of energy within the area may be generated based on an output.

19 Claims, 19 Drawing Sheets

EFFICIENT FLIGHT OPERATIONS BASED ON NATURALLY PRESENT ENERGY SOURCES OR SINKS

BACKGROUND

During airborne operations, an aerial vehicle is commonly subjected to a variety of forces of different natures and degrees. For example, an aerial vehicle may be subjected to forces generated by air flowing above, below and around the aerial vehicle in flight, including forces of thrust, lift, shear or drag.

In many aerial vehicles, lift is generated when an airfoil passes through air, diverting the air and changing air pressure levels above and below the airfoil. Air flowing above an airfoil expands, and air flowing below the airfoil contracts, resulting in reduced air pressure above the airfoil and increased air pressure below the airfoil, and imparting forces upon the airfoil that tend to maintain the aerial vehicle aloft. Thus, the buoyancy of an aerial vehicle naturally depends on a variety of attributes of air within which the aerial vehicle operates, including but not limited to velocities, pressures, densities, moisture content and material composition of the air. Such attributes may themselves depend on any of a number of factors, including but not limited to atmospheric conditions or available sunlight, as well as slopes, curvatures, material content or reflectivity.

DETAILED DESCRIPTION

As is set forth in greater detail below, the present disclosure is directed to engaging in efficient flight operations based on naturally present sources or sinks of energy. More specifically, one or more of the systems and methods of the present disclosure is directed to detecting changes in energy of an aerial vehicle that are unrelated to any operational changes in the aerial vehicle, such as a change in altitude that is not attributable to changes in pitch or work supplied by propulsion motors. When a change in energy of an aerial vehicle is detected, a ground-based location associated with the change in energy is determined, and the change in energy may be attributed to the availability of one or more energy sources or sinks that are naturally present at such locations. A map or other cartographic representation of naturally present energy sources or sinks may be derived from such locations. A map of naturally present energy sources or sinks may be used to plan efficient flight operations of an aerial vehicle, such as by directing the aerial vehicle to fly over areas where a surplus of naturally present energy exists or is believed to exist, or to avoid areas where a deficit of naturally present energy exists or is believed to exist. Moreover, a map of naturally present energy sources or sinks may also be derived by one or more machine learning systems. For example, a machine learning tool may be trained to associate imaging data captured from a region (e.g., images captured using aerial vehicles, orbiting satellites or other systems) with naturally present energy, e.g., using maps of naturally present energy sources or sinks within regions and images of such regions as a training set. An image of a region (e.g., an image captured using an aerial vehicle, an orbiting satellite or another system) may be provided to a machine learning tool that is so trained as an input, and a map of naturally present energy sources or sinks within the region may be derived based on an output received from the machine learning tool.

Figure 1A:
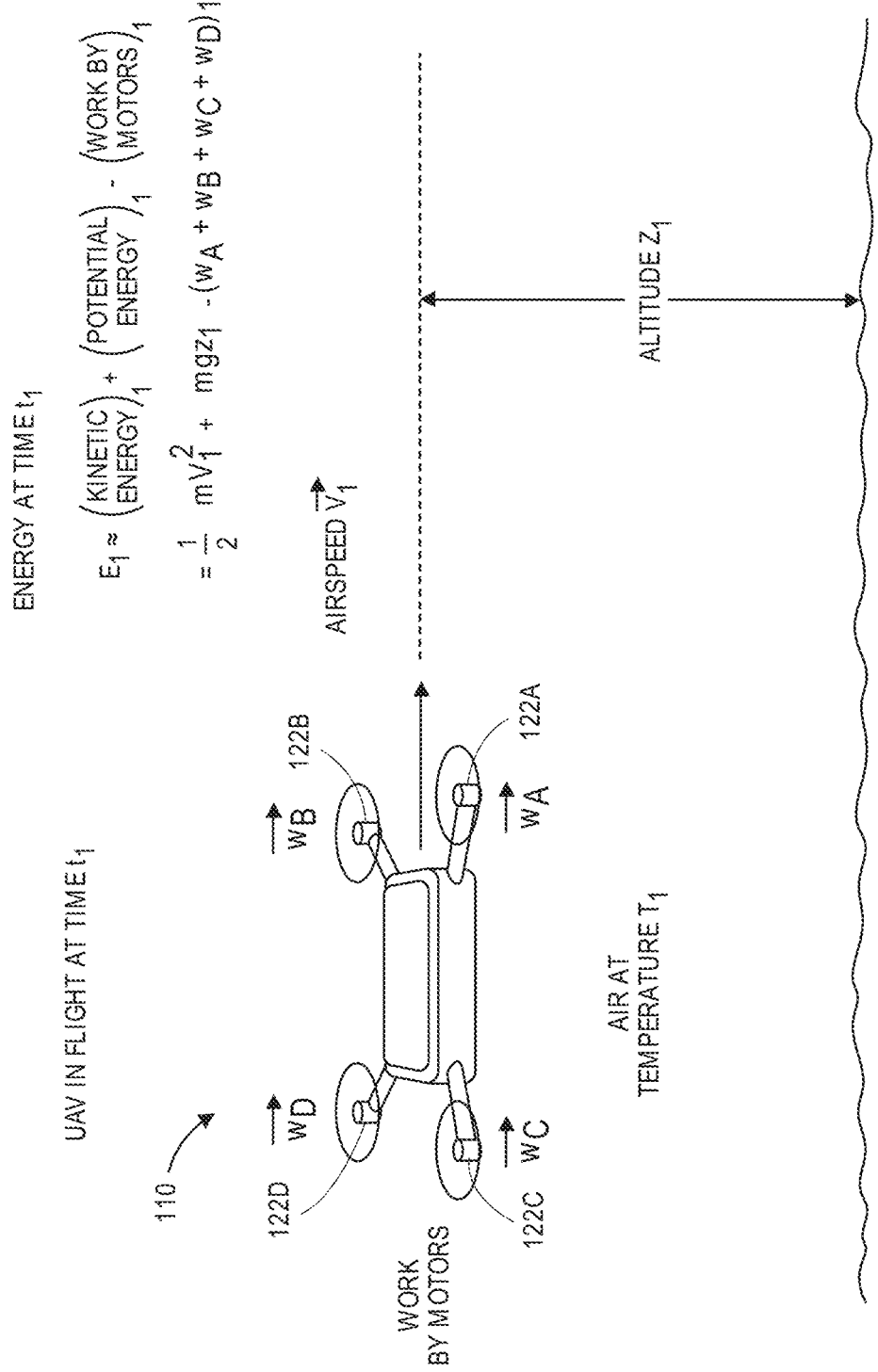
FIGS. 1A through 1D are views of aspects of one system for engaging in efficient flight operations based on naturally present energy sources or sinks in accordance with embodiments of the present disclosure.

Referring to FIGS. 1A through 1D, an aerial vehicle 110 is shown. As is shown in FIG. 1A, the aerial vehicle 110 is traveling under power of four propulsion motors 122A, 122B, 122C, 122D, each of which is performing work $w_A$, $w_B$, $w_C$, $w_D$, respectively, on air surrounding the aerial vehicle 110 to generate forces of lift and/or thrust for the aerial vehicle 110 at a time $t_1$. The air surrounding the aerial vehicle 110 is at a temperature $T_1$. The lift and/or thrust generated by the propulsion motors 122A, 122B, 122C, 122D cause the aerial vehicle 110 to travel at an airspeed $V_1$ and to remain aloft at an altitude $z_1$ at time $t_1$.

One measure of a level of energy $E_1$ of the aerial vehicle 110 at time $t_1$ may be calculated to include components of kinetic energy and components of potential energy (e.g., gravitational potential energy). The measure of the level of energy $E_1$ may be offset by work supplied to the aerial vehicle 110, e.g., by the propulsion motors 122A, 122B, 122C, 122D. The kinetic energy of the aerial vehicle 110 at time $t_1$ is equal to one-half a product of a mass m of the aerial vehicle 110 and a square of the airspeed $V_1$ of the aerial vehicle at time $t_1$, or $\frac{1}{2} mV_1^2$. The potential energy of the aerial vehicle 110 at time $t_1$ is equal to a product of the mass m of the aerial vehicle 110, acceleration due to gravity g, viz., approximately 9.81 meters per second per second, or 32.2 feet per second per second, and the altitude $z_1$ at time $t_1$, or $mgz_1$. Accordingly, as is also shown in FIG. 1A, a measure of the level of energy $E_1$ of the aerial vehicle 110 at time $t_1$ may be calculated as a sum of the kinetic energy $\frac{1}{2}mV_1^2$ and the potential energy $mgz_1$, less the work $w_A$, $w_B$, $w_C$, $w_D$ performed by the propulsion motors 122A, 122B, 122C, 122D at time $t_1$.

Figure 1B:
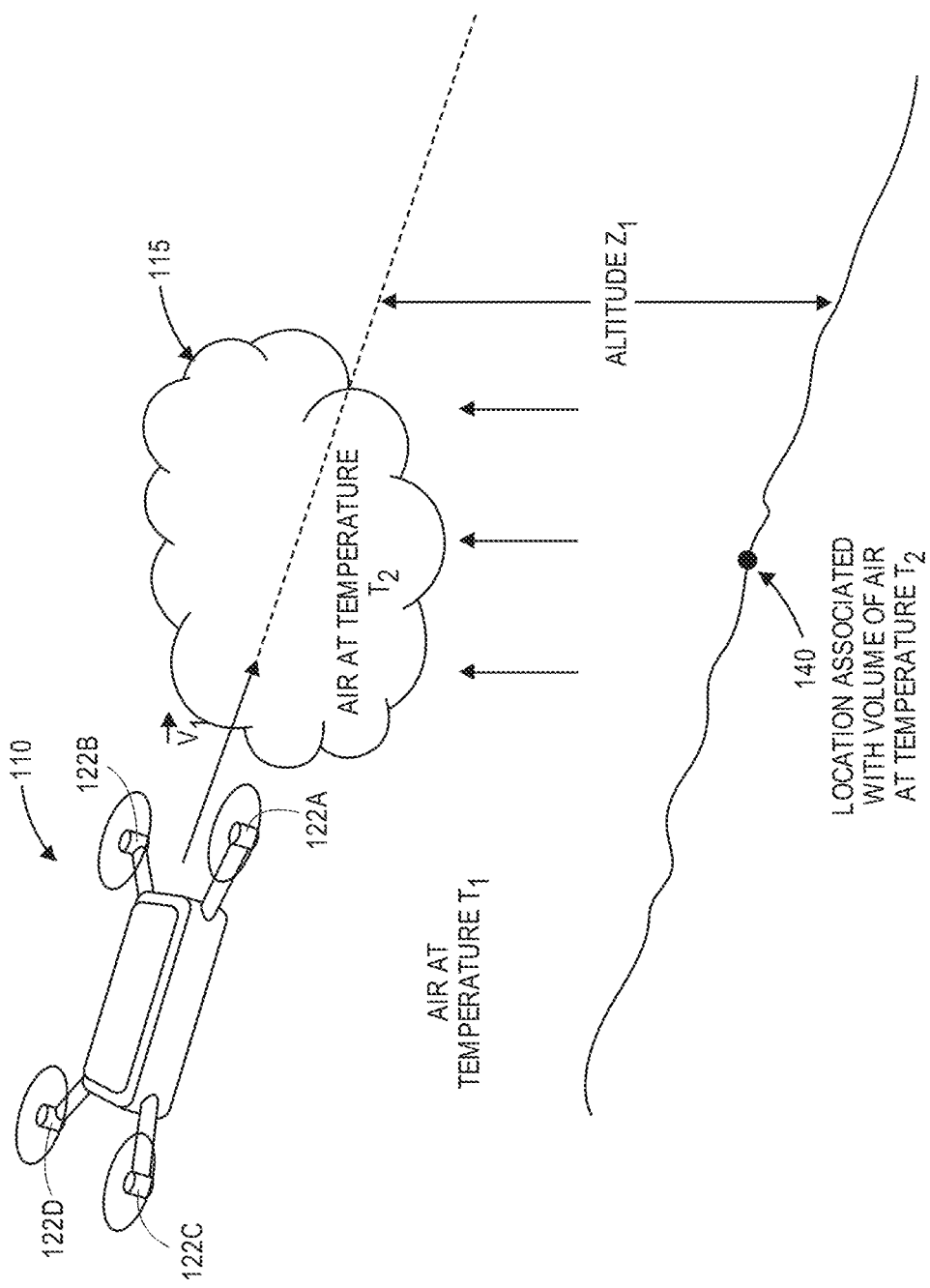

As is shown in FIG. 1B, the aerial vehicle 110 encounters a volume 115 of air (e.g., a thermal column or pocket of air) at time $t_2$, while traveling at the airspeed $V_1$ and at the altitude $z_1$. The volume 115 of air has a temperature $T_2$, which is greater than the temperature $T_1$, and is moving upward above a ground-based location 140. For example, where the sun heats a portion of the surface of the Earth, e.g., by solar radiation, air above the portion of the surface of the Earth is likewise heated, and expands in volume, thereby forming an atmospheric updraft that replaces cooler, denser air above the warmer, less dense air.

Figure 1C:
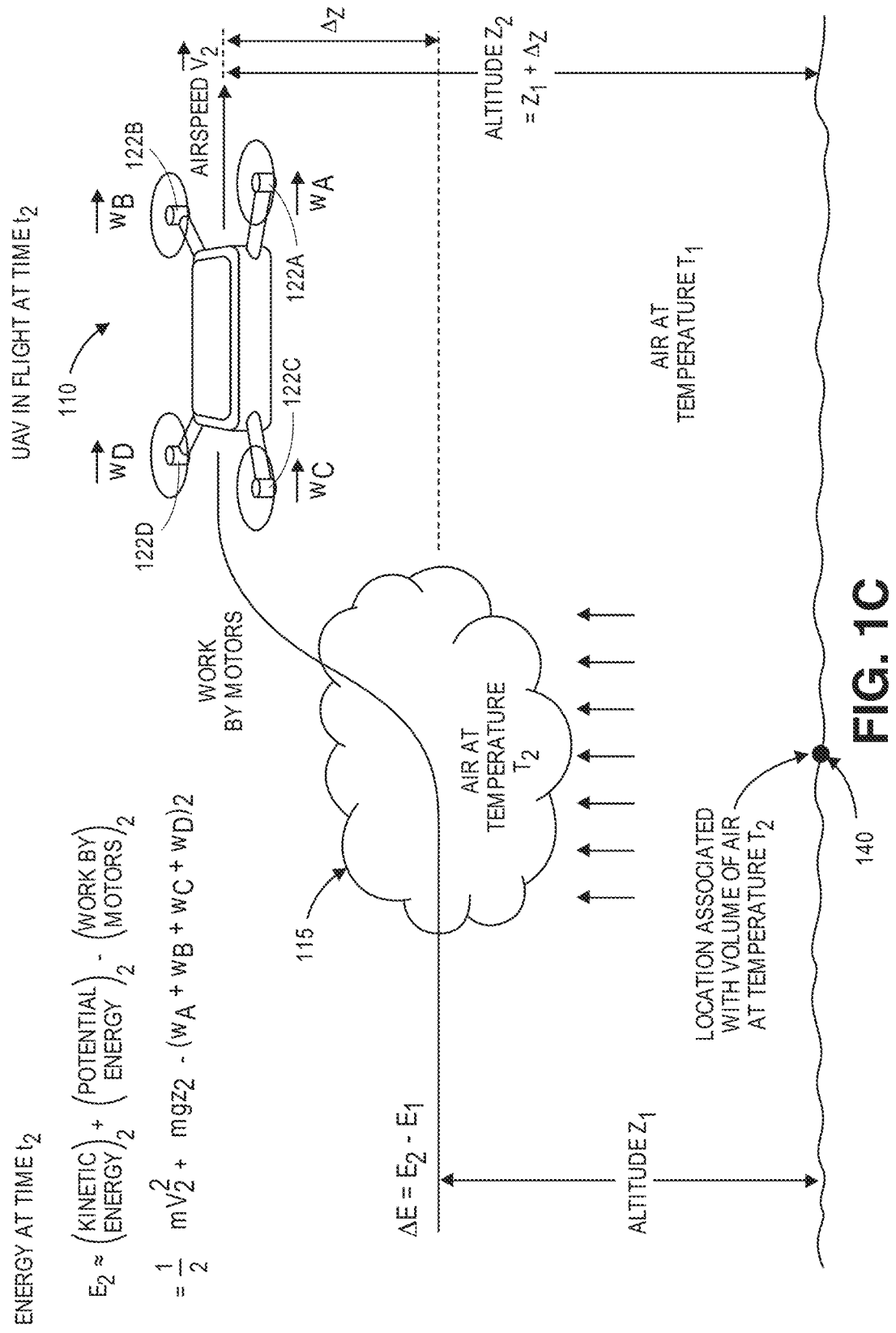

As is shown in FIG. 1C, the volume 115 of air causes the aerial vehicle 110 to rise in altitude by an amount $\Delta z$, to an altitude $z_2$. Accordingly, as is also shown in FIG. 1C, a level of energy $E_2$ of the aerial vehicle 110 at time $t_2$ may be calculated as a sum of the kinetic energy at time $t_2$, or $2mV_2^2$, and the potential energy at time $t_2$, or $mgz_2$, less the work $w_A$, $w_B$, $w_C$, $w_D$ performed by the propulsion motors 122A, 122B, 122C, 122D at time $t_2$. A difference between the level of energy $E_2$ and the level of energy $E_1$ may be associated with the ground-based location 140 and the time $t_2$ may be determined by one or more position sensors (e.g., Global Positioning System, or "GPS," sensors) aboard the aerial vehicle 110. For example, where the work $w_A$, $w_B$, $w_C$, $w_D$ performed by the propulsion motors 122A, 122B, 122C, 122D did not change from time $t_1$ to time $t_2$, and where the airspeed $V_2$ of the aerial vehicle 110 at time $t_2$ equals the airspeed $V_1$ of the aerial vehicle 110 at time $t_1$, the change in altitude $\Delta z$ from altitude $z_1$ to altitude $z_2$ may be attributed to the rising volume 115 of air at the location 140.

Figure 1D:
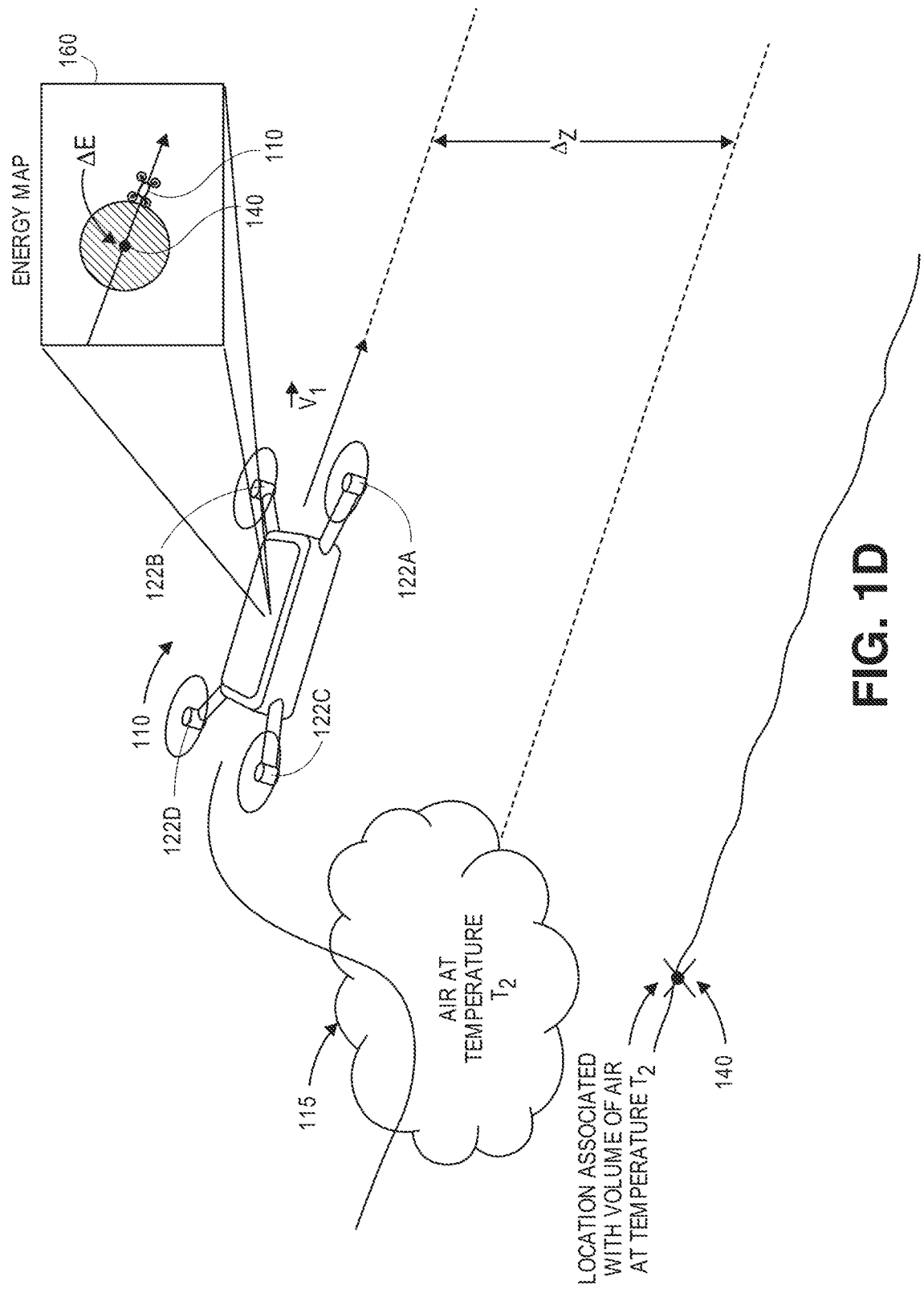

As is shown in FIG. 1D, the location 140 of the change in altitude $\Delta z$ may be plotted in association with the time $t_2$ on a map 160 or other cartographic representation of naturally present energy sources or sinks. Subsequently, the aerial vehicle 110, or other aerial vehicles (not shown), may elect to fly over the location 140 during one or more missions, and may consider including the location 140 in one or more routes or paths associated with travel throughout the same region, such as to rely on the surplus energy that is naturally present at the location 140. In some embodiments, an aerial vehicle may be generally programmed to fly over the location 140 at all times, where feasible, with the expectation that the surplus energy that was present at the location 140 at time $t_2$ may also be present at such times. In some other embodiments, an aerial vehicle may be programmed to fly over the location 140 at times that are similar to time $t_2$, e.g., at the same time of day as time $t_2$, on the same date of the week as time $t_2$, or during the same month of the year as time $t_2$, with the expectation that the surplus energy that was present at the location 140 at time $t_2$ may also be present at such times. In still other embodiments, an aerial vehicle may be programmed to fly over the location 140 at times when atmospheric conditions (e.g., sunlight or cloud cover) are similar to atmospheric conditions at the location 140 at time $t_2$.

Additionally, an amount of the surplus energy may be estimated, for example, based on the amount of the change in altitude $\Delta z$. For example, where the change in altitude $\Delta z$ is attributed to the volume 115 of air at the location 140, one estimate of the energy available at the location may be determined to equal the change $\Delta E$ in energy levels $E_2 - E_1$. Where the change $\Delta E$ is attributed solely to the change in altitude $\Delta z$, e.g., where the airspeed $V_1$ and work $w_A$, $w_B$, $w_C$, $w_D$ provided by the propulsion motors did not change between time $t_1$ and time $t_2$, the change $\Delta E$ may be estimated as a product of the mass m of the aerial vehicle 110, acceleration due to gravity g, and the change in altitude $\Delta z$. A similar amount of energy may be available at the location 140 at times in the future and relied upon in planning routes or paths of aerial vehicles having masses that are different from the mass m of the aerial vehicle 110, aerial vehicles that are traveling at airspeeds other than the airspeed $V_1$ or the airspeed $V_2$, or aerial vehicles having propulsion motors performing work other than the work $w_A$, $w_B$, $w_C$, $w_D$. Moreover, the systems and methods of the present disclosure work equally well where the volume 115 of air is at a lower temperature than its surroundings, e.g., where the temperature $T_2$ is less than the temperature $T_1$, thereby causing the aerial vehicle 110 to experience a negative change in altitude $\Delta z$. Where the temperature $T_2$ is less than the temperature $T_1$, the location 140 of the negative change in altitude $\Delta z$ may be plotted in association with the time $t_2$ on a map 160 or other cartographic representation of naturally present energy sources or sinks, and the aerial vehicle 110, or other aerial vehicles, may be programmed to avoid the location 140 during one or more missions, to avoid the deficit of energy that is naturally present at the location 140.

Accordingly, the systems and methods of the present disclosure may detect changes in energy of an aerial vehicle that are explained by any operational changes of an aerial vehicle, e.g., planned or deliberate changes in altitude or speed, or planned or deliberate changes in the operation of one or more propulsion motors. The aerial vehicle may attribute such changes in energy to one or more sources or sinks of energy that may be naturally present at locations where such changes are observed. In some embodiments, a map or other cartographic representation of such locations within a region may be generated and used to select one or more routes or paths for the aerial vehicle, or for other aerial vehicles, traveling through the region. In some embodiments, where maps or other cartographic representations are generated for a plurality of regions, imaging data (e.g., aerial or satellite photographs) of the regions and the cartographic representations may be used to train a machine learning system to recognize locations where sources or sinks of energy are naturally present using one or more photographs. Subsequently, a photograph of a region may be captured and provided to the machine learning system as an input, and a map of energy sources or sinks that are naturally present within the region may be generated based on an output received from the machine learning system.

The law of conservation of energy implies that energy is neither created nor destroyed, such that a level of energy of a system may be calculated as a sum of potential energy and kinetic energy of a system, less the effects of work performed on or by the system. Gravitational potential energy is energy that is possessed by a body by virtue of its position relative to others, which is determined as a product of a mass of the body, acceleration due to gravity, and a height above a surface. Acceleration due to gravity of the Earth is calculated with respect to the law of universal gravitation and the universal gravitation constant (or the Newtonian constant of gravitation), $6.674 \times 10^{-11}$ N·m$^2$/kg$^2$, and is approximately the same value at operating altitudes of most aerial vehicles. Kinetic energy of a body is equal to an integral of momentum of a body with respect to velocity of the body, or one-half a product of a mass of the body and a square of the velocity of the body.

Air is a compressible fluid that surrounds the Earth and consists primarily of nitrogen, about seventy-eight percent by volume, and oxygen, about twenty-one percent by volume, along with trace amounts of other atoms or molecules such as argon, carbon dioxide, water or others. As a compressible fluid, air is subject to several large-scale mechanical effects. For example, because air itself has mass, air pressure is generally greater at the Earth's surface than at altitudes above the Earth's surface, due to the weight of air. Additionally, air, like land and water, is subject to heating in the presence of sunlight and cooling in the absence of sunlight, e.g., due to periodic rotations of the Earth. Variations in heating and cooling of air lead to variations in pressures of the air, thereby causing flows of air to mechanical diffusion, viz., where a fluid flows due to a difference in pressure. For example, solar heating of the Earth's surface causes air near the surface to be heated and to thereby expand, causing cooler air of higher densities to displace the warmed air in a cyclic, vertical pattern. The extent of heating and cooling, and air flow generated thereby, may vary due to cloud cover or other environmental effects. The displacement of the air continues until the heated air reaches the same temperature as the surrounding area. The amount of the heated air may depend on various factors, including one or more colors of the surface, contents or concentrations of the heated air or surrounding air, or any other atmospheric factors.

Additionally, air flow also varies in the presence of obstructions such as terrain (e.g., hills or mountains), plant life (e.g., trees) or structures (e.g., buildings). For example, air flow passing over such obstructions may cause upward drafts and/or waves on a windward side of such obstructions, and downward drafts and/or waves on a leeward side of such obstructions. The effects of such flows may vary due to temperatures, pressures, moisture contents of the flows, as well as velocities of the flows.

Machine learning tools, such as artificial neural networks, have been utilized to identify relations between respective elements of apparently unrelated sets of data. An artificial neural network is a parallel distributed computing processor system comprised of individual units that may collectively learn and store experimental knowledge, and make such knowledge available for use in one or more applications. Such a network may simulate the non-linear mental performance of the many neurons of the human brain in multiple layers by acquiring knowledge from an environment through one or more flexible learning processes, determining the strengths of the respective connections between such neurons, and utilizing such strengths when storing acquired knowledge. Like the human brain, an artificial neural network may use any number of neurons in any number of layers, including an input layer, an output layer, and one or more intervening hidden layers. In view of their versatility, and their inherent mimicking of the human brain, machine learning tools including not only artificial neural networks but also nearest neighbor methods or analyses, factorization methods or techniques, K-means clustering analyses or techniques, similarity measures such as log likelihood similarities or cosine similarities, latent Dirichlet allocations or other topic models, or latent semantic analyses have been utilized in various applications.

Machine learning tools, such as artificial neural networks, may be trained to map inputted data to desired outputs by adjusting the strengths of the connections between one or more neurons, which are sometimes called synaptic weights. An artificial neural network may have any number of layers, including an input layer, an output layer, and any number of intervening hidden layers. Each of the neurons in a layer within a neural network may receive an input and generate an output in accordance with an activation or energy function, with parameters corresponding to the various strengths or synaptic weights. For example, in a heterogeneous neural network, each of the neurons within the network may be understood to have different activation or energy functions. In some neural networks, at least one of the activation or energy functions may take the form of a sigmoid function, wherein an output thereof may have a range of zero to one or 0 to 1. In other neural networks, at least one of the activation or energy functions may take the form of a hyperbolic tangent function, wherein an output thereof may have a range of negative one to positive one, or $-1$ to $+1$. Thus, the training of a neural network according to an identity function results in the redefinition or adjustment of the strengths or weights of such connections between neurons in the various layers of the neural network, in order to provide an output that most closely approximates or associates with the input to the maximum practicable extent.

Artificial neural networks may typically be characterized as either feedforward neural networks or recurrent neural networks, and may be fully or partially connected. In a feedforward neural network, e.g., a convolutional neural network, information may specifically flow in one direction from an input layer to an output layer, while in a recurrent neural network, at least one feedback loop returns information regarding the difference between the actual output and the targeted output for training purposes. Additionally, in a fully connected neural network architecture, each of the neurons in one of the layers is connected to all of the neurons in a subsequent layer. By contrast, in a sparsely connected neural network architecture, the number of activations of each of the neurons is limited, such as by a sparsity parameter.

Moreover, the training of a neural network is typically characterized as supervised or unsupervised. In supervised learning, a training set comprises at least one input and at least one target output for the input. Thus, the neural network is trained to identify the target output, to within an acceptable level of error. In unsupervised learning of an identity function, such as that which is typically performed by a sparse autoencoder, target output of the training set is the input, and the neural network is trained to recognize the input as such. Sparse autoencoders employ backpropagation in order to train the autoencoders to recognize an approximation of an identity function for an input, or to otherwise approximate the input. Such backpropagation algorithms may operate according to methods of steepest descent, conjugate gradient methods, or other like methods or techniques, in accordance with the systems and methods of the present disclosure. Those of ordinary skill in the pertinent art would recognize that any algorithm or method may be used to train one or more layers of a neural network. Likewise, any algorithm or method may be used to determine and minimize errors in an output of such a network. Additionally, those of ordinary skill in the pertinent art would further recognize that the various layers of a neural network may be trained collectively, such as in a sparse autoencoder, or individually, such that each output from one hidden layer of the neural network acts as an input to a subsequent hidden layer.

Once a neural network has been trained to recognize dominant characteristics of an input of a training set, e.g., to associate an image with one or more labels to within an acceptable tolerance, an input in the form of an image may be provided to the trained network, and one or more labels may be identified based on the output thereof.

The systems and methods of the present disclosure are directed to detecting changes in energy of an aerial vehicle (e.g., changes in altitude) that are not attributed to any changes in operational activity of the aerial vehicle, such as increases or decreases in operating speeds of one or more propulsion motors. In some embodiments, locations within a region where such changes in energy are observed may be determined and used to generate a map or other cartographic representation of the region. In some other embodiments, the map or other cartographic representation may be used to select one or more routes or paths within the region for the aerial vehicle, or for other aerial vehicles, such as by directing the aerial vehicles to fly over locations where surplus energy is available, or to avoid locations where deficits in energy are found. For example, while flying over an area where surplus energy is available, an aerial vehicle may reduce a level of power supplied to one or more propulsion motors, as necessary, while remaining on a desired altitude. Alternatively, an aerial vehicle may elect to fly over areas where an energy source is naturally available to increase its altitude without increasing a level of power supplied to one or more propulsion motors, or over areas where an energy sink is naturally available to decrease its altitude. An aerial vehicle may exploit the natural presence or absence of energy deficits for any reason during flight operations. In still other embodiments, maps or other cartographic representations of energy sources or sinks may be generated through the use of a machine learning system that is trained to associate images of regions with sources or sinks of energy that are naturally present at such regions.

The maps or other cartographic representations of changes in energy may be two-dimensional or three-dimensional in nature. For example, in some embodiments, where an aerial vehicle detects a change in energy that is not attributed to operational changes of the aerial vehicle, a location of the change may be determined based on coordinates of a ground-based point below which the change in energy was observed (e.g., a latitude and a longitude). A two-dimensional map or other cartographic representation of energy sources or sinks may be derived based on the ground-based point and, alternatively, a magnitude of a change in energy. In some embodiments, the location may be determined based on coordinates of the ground-based point and also an altitude of the aerial vehicle when the change in energy was observed. A three-dimensional map or other cartographic representation of energy sources or sinks may be derived based on the ground-based point, the altitude, and, alternatively, a magnitude of a change in energy.

A location, a time, an altitude and an air speed of an aerial vehicle when a change in energy that is not attributed to an operational change of the aerial vehicle may be detected or determined using any type or form of components or systems. For example, an aerial vehicle may be outfitted or equipped with one or more position sensors, e.g., GPS sensors, or cellular telephonic equipment from which a position of the aerial vehicle may be determined. Positions determined using such systems or components may be used to record a location of a change in energy, or to determine an airspeed of the aerial vehicle at the location. An aerial vehicle may also be outfitted or equipped with a global clock, or a component or system having a global clock, from which a time at which a change in energy is detected may be determined. An aerial vehicle may be further equipped with one or more altimeters and/or speed sensors for determining altitudes and/or airspeeds of an aerial vehicle at a time at which a change in energy is detected, or barometers, thermometers or other systems for evaluating atmospheric or weather conditions at a location where the change in energy is detected.

Moreover, and as is discussed above, contributions of propulsion motors to the motion of an aerial vehicle may be considered and/or disregarded when calculating a level of energy of the aerial vehicle. For example, where an aerial vehicle includes one or more propulsion motors, a change in altitude or velocity of the aerial vehicle may be observed where such propulsion motors increase or decrease their operating speeds. Such a change, however, may be entirely unrelated to any naturally present energy sources or sinks.

Figure 2:
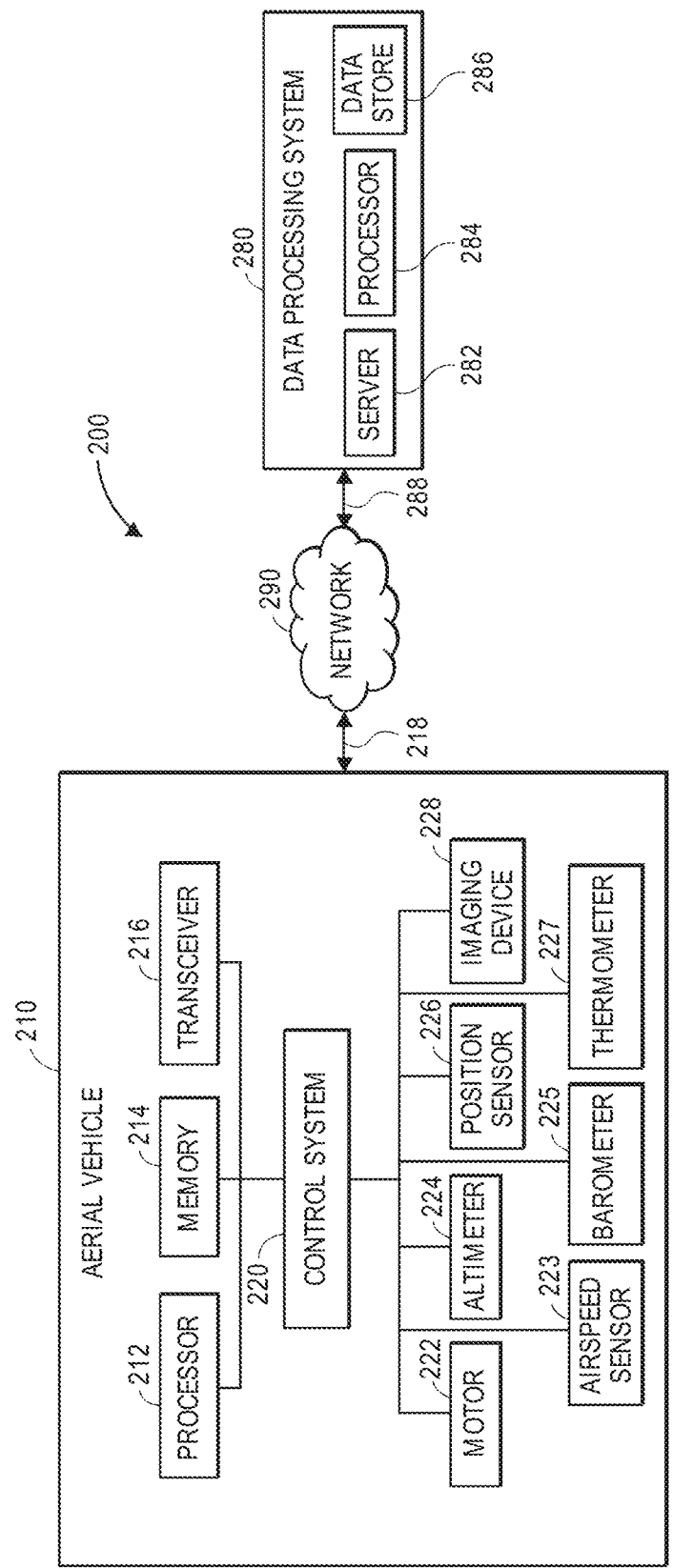
FIG. 2 is a block diagram of one system for engaging in efficient flight operations based on naturally present energy sources or sinks in accordance with embodiments of the present disclosure.

Referring to FIG. 2, a block diagram of one system 200 for engaging in efficient flight operations based on naturally present energy sources or sinks in accordance with embodiments of the present disclosure is shown. The system 200 of FIG. 2 includes an aerial vehicle 210 and a data processing system 280 connected to one another over a network 290, which may include the Internet, in whole or in part. Except where otherwise noted, reference numerals preceded by the number "2" shown in FIG. 2 indicate components or features that are similar to components or features having reference numerals preceded by the number "1" shown in FIGS. 1A through 1D.

The aerial vehicle 210 includes a processor 212, a memory 214 and a transceiver 216. The aerial vehicle 210 further includes a control system 220, a plurality of propulsion motors 222, an airspeed sensor 223, an altimeter 224, a barometer 225, a position sensor 226, a thermometer 227, and an imaging device 228.

The processor 212 may be configured to perform any type or form of computing function associated with the operation of the aerial vehicle 210, including but not limited to the execution of one or more machine learning algorithms or techniques. The processor 212 may also be configured to execute any other algorithms or techniques (e.g., object detection or recognition algorithms or techniques) associated with one or more applications, purposes or functions, e.g., to select at least one of a course, a speed or an altitude for the safe operation of the aerial vehicle 210. For example, the processor 212 may be configured to control any aspects of the operation of the aerial vehicle 210 and the one or more computer-based components thereon, including but not limited to the propulsion motors 222, the airspeed sensor 223, the altimeter 224, the barometer 225, the position sensor 226, the thermometer 227 and/or the imaging device 228. For example, the processor 212 may control the operation of one or more control systems or modules, such as the control system 220, for generating instructions for conducting operations of one or more of the propulsion motors 222, the altimeter 224, the position sensor 226 and/or the imaging device 228, or for interpreting information or data captured using one or more of the airspeed sensor 223, the barometer 225 or the thermometer 227. Such control systems or modules may be associated with one or more other computing devices or machines, and may communicate with the data processing system 280 or one or more other computer devices or aerial vehicles (not shown) over the network 290, through the sending and receiving of digital data.

The processor 212 may be a uniprocessor system including one processor, or a multiprocessor system including several processors (e.g., two, four, eight, or another suitable number), and may be capable of executing instructions. For example, in some embodiments, the processor 212 may be a general-purpose or embedded processor unit such as a CPU or a GPU having any number of instruction set architectures (ISAs), such as the x86, PowerPC, SPARC, or MIPS ISAs, or any other suitable ISA. Where the processor 212 is a multiprocessor system, each of the processors within the multiprocessor system may operate the same ISA, or different ISAs.

Additionally, the aerial vehicle 210 further includes one or more memory or storage components 214 (such as databases or data stores) for storing any type of information or data, e.g., instructions for operating the aerial vehicle 210, or information or data captured during operations of the aerial vehicle 210. For example, the memory 214 may be configured to store one or more locations where changes in energy are observed, amounts or extents of the changes in energy, airspeeds and/or propulsion motor operating data, imaging data or any other information or data. The memory 214 may be configured to store executable instructions, imaging data, flight paths, flight control parameters and/or other data items accessible by or to the processor 212. The memory 214 may be implemented using any suitable memory technology, such as random-access memory (or "RAM"), static RAM (or "SRAM"), synchronous dynamic RAM (or "SDRAM"), nonvolatile/Flash-type memory, or any other type of memory. In some embodiments, program instructions, imaging data, flight paths, flight control parameters and/or other data items may be received or sent via the transceiver 216, e.g., by transmission media or signals, such as electrical, electromagnetic, or digital signals, which may be conveyed via a communication medium such as a wired and/or a wireless link.

The transceiver 216 may be configured to enable the aerial vehicle 210 to communicate through one or more wired or wireless means, e.g., wired technologies such as Universal Serial Bus (or "USB") or fiber optic cable, or standard wireless protocols such as Bluetooth® or any Wireless Fidelity (or "Wi-Fi") protocol, such as over the network 290 or directly. The transceiver 216 may further include or be in communication with one or more input/output (or "I/O") interfaces, network interfaces and/or input/output devices, and may be configured to allow information or data to be exchanged between one or more of the components of the aerial vehicle 210, or to one or more other computer devices or systems (e.g., other aerial vehicles, not shown) via the network 290. For example, in some embodiments, the transceiver 216 may be configured to coordinate I/O traffic between the processor 212 and one or more onboard or external computer devices or components, e.g., the propulsion motors 222, the airspeed sensor 223, the altimeter 224, the barometer 225, the position sensor 226, the thermometer 227 and/or the imaging device 228. The transceiver 216 may perform any necessary protocol, timing or other data transformations in order to convert data signals from a first format suitable for use by one component into a second format suitable for use by another component. In some embodiments, the transceiver 216 may include support for devices attached through various types of peripheral buses, e.g., variants of the Peripheral Component Interconnect (PCI) bus standard or the Universal Serial Bus (USB) standard. In some other embodiments, functions of the transceiver 216 may be split into two or more separate components, or integrated with the processor 212.

The control system 220 may include one or more electronic speed controls, power supplies, navigation systems and/or payload engagement controllers for controlling aspects of the operation of the aerial vehicle 210, as desired. For example, the control system 220 may be configured to cause or control the operation of one or more of the propulsion motors 222, the altimeter 224, the position sensor 226 and/or the imaging device 228, such as to cause one or more of the propulsion motors 222 to rotate propellers at desired speeds, to capture information or data regarding altitudes, positions and/or speeds, and to cause one or more of the imaging devices 228 to capture any imaging data (e.g., still or moving images) as well as any associated audio data and/or metadata. The control system 220 may also operate the one or more propulsion motors 222 to cause such propellers to be aligned in selected positions or angles. The control system 220 may further control any other aspects of the aerial vehicle 210, including but not limited to the operation of one or more control surfaces (not shown) such as wings, rudders, ailerons, elevators, flaps, brakes, slats or other features within desired ranges, or the enactment with or release of one or more items by one or more engagement systems (not shown). In some embodiments, the control system 220 may be integrated with one or more of the processor 212, the memory 214 and/or the transceiver 216.

The propulsion motors 222 may be any type or form of motor (e.g., electric, gasoline-powered or any other type of motor) capable of generating sufficient rotational speeds of one or more propellers or other components to provide lift and/or thrust forces to the aerial vehicle 210 and any payload engaged thereby, to aerially transport the engaged payload thereby. In some embodiments, one or more of the propulsion motors 222 may be a brushless DC multi-phase motor such as an outrunner brushless motor or an inrunner brushless motor.

The aerial vehicle 210 may include any number of such propulsion motors 222 of any kind. For example, one or more of the propulsion motors 222 may be aligned or configured to provide forces of lift to the aerial vehicle 210, exclusively, while one or more of the propulsion motors 222 may be aligned or configured to provide forces of thrust to the aerial vehicle 210, exclusively. Alternatively, one or more of the propulsion motors 222 may be aligned or configured to provide forces of lift and forces of thrust to the aerial vehicle 210, as needed. For example, the propulsion motors 222 may be fixed in their orientation on the aerial vehicle 210, or configured to vary their respective orientations, e.g., a tilt-rotor aircraft. Moreover, the propulsion motors 222 may be aligned or configured to operate with different capacities or ratings, or at different speeds, or coupled to propellers having different sizes and shapes. Additionally, one or more of the propulsion motors 222 may be an electric motor, e.g., a brushless DC multi-phase motor, and one or more of the propulsion motors 222 may be a gasoline-powered motor.

Each of the propulsion motors 222 may be coupled to one or more propellers (or rotors or rotatable systems) having a plurality of shaped blades joined to a hub or boss. For example, each of such propellers may be rotatably mounted to a mast or shaft associated with a respective one of the propulsion motors 222 and may be configured to generate forces of thrust when rotated within a fluid. Each of such propellers may include any number of blades, and may be fixed pitch, adjustable pitch or variable pitch in nature. Moreover, one or more of such propellers may be banded or shielded in any manner. In some embodiments, one or more propellers may be configured to rotate about a vertical axis, and to provide forces of lift in a vertical direction (e.g., upward) accordingly. In some other embodiments, one or more of the propellers may be configured to rotate about a horizontal axis, and to provide forces of thrust in a horizontal direction (e.g., forward) accordingly. In still other embodiments, one or more of the propellers may be configured to rotate about axes that are neither horizontal nor vertical, and to provide forces of lift and/or thrust in directions corresponding to such axes accordingly.

The airspeed sensor 223 may be one or more of any type or form of anemometer or other system for determining a speed of air flow within a vicinity of the aerial vehicle 210. The airspeed sensor 223 may include one or more pitot tubes, ultrasonic transceivers (e.g., transmitters and/or receivers) or the like, and may operate independently or in conjunction with one another. Alternatively, the airspeed sensor 223 may include one or more other devices, components, systems, or instruments for determining a speed or velocity of the aerial vehicle 210, and may operate in conjunction with one or more of the altimeter 224, the position sensor 226, or any other system. The altimeter 224 may be any device, component, system, or instrument for determining an altitude of the aerial vehicle 210, and may include any number of barometers, transmitters, receivers, range finders (e.g., laser or radar), imaging devices or other features for determining altitudes above ground. The barometer 225 may be any system for determining a level of atmospheric pressure (e.g., relative or absolute) within a vicinity of the aerial vehicle 210.

The position sensor 226 may be any device, component, system or instrument adapted to receive signals (e.g., trilateration data or information) relating to a position of the aerial vehicle 210, from one or more GPS satellites of a GPS network, from one or more towers or beacons from a cellular telephone network, or from any other source (not shown). In some embodiments, the position sensor 226, or position data received thereby, may be used to determine an airspeed of the aerial vehicle 210 overtime. In some other embodiments, the aerial vehicle 210 may include one or more devices, components, systems, or instruments for determining a speed or velocity of the aerial vehicle 210, and may include related components (not shown) such as pitot tubes, accelerometers, or other features. The thermometer 227 may be any system or device for determining a temperature of air within a vicinity of the aerial vehicle 210, including but not limited to one or more mercury-in-glass thermometers, bimetallic thermometers, pressure thermometers, thermocouples, resistance temperature detectors, thermistors or monolithic temperature sensors, or any others.

The imaging device 228 may be any form of optical recording devices that may be aligned with respect to any expected or ordinary operating orientation of the aerial vehicle 210, and are configured to photograph or otherwise record imaging data of objects or any other elements within fields of view forward of, aft of, lateral to, above or below the aerial vehicle 210, or for any other purpose. The imaging device 228 may include one or more processors, one or more memory or storage components, and one or more image sensors, e.g., color sensors, grayscale sensors, black-and-white sensors, depth sensors, or the like, and may further include one or more photosensitive surfaces, filters, chips, electrodes, clocks, boards, timers, power sources, connectors or any other relevant features (not shown). The imaging device 228 may capture imaging data in the form of one or more still or moving images of any kind or form, as well as any relevant audio signals or other information during the operation of the aerial vehicle 210.

The imaging device 228 may be mounted, fixed, embedded or otherwise joined to one or more external surfaces of the aerial vehicle 210 in any manner and in any orientation or alignment to capture imaging data from above the aerial vehicle 210. For example, the imaging device 228 may be coupled to any form of support system or structure for maintaining the lenses or other optical elements of the imaging device 228 at a selected orientation or configuration. Alternatively, the imaging device 228 may be mounted, fixed, embedded or otherwise joined to external surfaces of the aerial vehicle 210 in any other manner.

The imaging device 228 may communicate with the processor 212 and/or the control system 220, or with one another, by way of a wired or wireless connection that may be dedicated or comprise all or part of an internal network (not shown), e.g., an internal communications bus. Additionally, the imaging device 228 may be adapted or otherwise configured to communicate with the data processing system 280 by way of the network 290. The imaging device 228 may be of any type or form in accordance with the present disclosure, including but not limited to one or more digital cameras, depth sensors or range cameras, infrared cameras, radiographic cameras or other optical sensors.

In addition to the imaging device 228, the aerial vehicle 210 may also include any number of other sensors, components or other features for controlling or aiding in the operation of the aerial vehicle 210, including but not limited to one or more environmental or operational sensors for determining one or more attributes of an environment in which the aerial vehicle 210 is operating, or may be expected to operate, including extrinsic information or data or intrinsic information or data. For example, the aerial vehicle 210 may include one or more compasses, speedometers, thermometers, barometers, hygrometers, gyroscopes, air monitoring sensors (e.g., oxygen, ozone, hydrogen, carbon monoxide or carbon dioxide sensors), ozone monitors, pH sensors, magnetic anomaly detectors, metal detectors, radiation sensors (e.g., Geiger counters, neutron detectors, alpha detectors), attitude indicators, depth gauges, accelerometers, or sound sensors (e.g., microphones, piezoelectric sensors, vibration sensors or other transducers for detecting and recording acoustic energy from one or more directions).

Although the block diagram of FIG. 2 includes a single box for a propulsion motor 222, a single box for an airspeed sensor 223, a single box for an altimeter 224, a single box for a barometer 225, a single box for a position sensor 226, a single box for a thermometer 227 and a single box for an imaging device 228, those of ordinary skill in the pertinent arts will recognize that any number or type of propulsion motors, altimeters, position sensors and/or imaging devices may be provided aboard the aerial vehicle 210 in accordance with the present disclosure.

The data processing system 280 includes one or more physical computer servers 282 having one or more computer processors 284 and any number of data stores 286 (e.g., databases) associated therewith, as well as provided for any specific or general purpose. For example, the data processing system 280 of FIG. 2 may be independently provided for the exclusive purpose of receiving, analyzing or storing information or data relating to changes in energy of the aerial vehicle 210, along with times or positions of the aerial vehicle 210 at which such changes were observed, or imaging data captured using the imaging device 228, or, alternatively, provided in connection with one or more physical or virtual services that are configured to receive, analyze or store such information or data, or other information or data, as well as one or more other functions. The servers 282 may be connected to or otherwise communicate with the processors 284 and the data stores 286, which may store any type of information or data, including but not limited to information or data regarding positions or times of changes in energy, maps or other cartographic representations of locations of surplus or deficit energy, for any purpose. The servers 282 and/or the computer processors 284 may also connect to or otherwise communicate with the network 290, as indicated by line 288, through the sending and receiving of digital data. For example, the data processing system 280 may include any facilities, stations or locations having the ability or capacity to receive and store information or data in one or more data stores, e.g., from the aerial vehicle 210, from one or more other aerial vehicles, or from one or more other external computer systems (not shown) via the network 290. In some embodiments, the data processing system 280 may be provided in a physical location. In other such embodiments, the data processing system 280 may be provided in one or more alternate or virtual locations, e.g., in a "cloud"-based environment. In still other embodiments, the data processing system 280 may be provided onboard one or more aerial vehicles, including but not limited to the aerial vehicle 210.

The network 290 may be any wired network, wireless network, or combination thereof, and may comprise the Internet in whole or in part. In addition, the network 290 may be a personal area network, local area network, wide area network, cable network, satellite network, cellular telephone network, or combination thereof. The network 290 may also be a publicly accessible network of linked networks, possibly operated by various distinct parties, such as the Internet. In some embodiments, the network 290 may be a private or semi-private network, such as a corporate or university intranet. The network 290 may include one or more wireless networks, such as a Global System for Mobile Communications (GSM) network, a Code Division Multiple Access (CDMA) network, a Long-Term Evolution (LTE) network, or some other type of wireless network. Protocols and components for communicating via the Internet or any of the other aforementioned types of communication networks are well known to those skilled in the art of computer communications and thus, need not be described in more detail herein.

The computers, servers, devices and the like described herein have the necessary electronics, software, memory, storage, databases, firmware, logic/state machines, microprocessors, communication links, displays or other visual or audio user interfaces, printing devices, and any other input/output interfaces to provide any of the functions or services described herein and/or achieve the results described herein. Also, those of ordinary skill in the pertinent art will recognize that users of such computers, servers, devices and the like may operate a keyboard, keypad, mouse, stylus, touch screen, or other device (not shown) or method to interact with the computers, servers, devices and the like, or to "select" an item, link, node, hub or any other aspect of the present disclosure.

In some embodiments, the processor 212, the servers 282 and/or the processors 284 may be configured to execute one or more calculations regarding levels of energy of the aerial vehicle 210 and/or work performed by one or more propulsion motors 222 at any time, e.g., based on airspeeds of the aerial vehicle 210, altitudes of the aerial vehicle 210 and/or operating speeds or other characteristics of the propulsion motors 222. In some embodiments, the processor 212, the servers 282 and/or the processors 284 may be configured to generate two-dimensional or three-dimensional maps or other representations of locations at which changes of energy are observed, e.g., by the aerial vehicle 210 or by one or more other aerial vehicles 210. In some embodiments, the processor 212, the servers 282 and/or the processors 284 may be configured to determine an optimal path or route between two locations for the execution of a given task by the aerial vehicle 210 or one or more other aerial vehicles (not shown). The processor 212, the servers 282 and/or the processors 284 may determine an optimal path or route based on any factor or element, including but not limited to times required to travel on any paths of an optimal route, any costs associated with traveling on the paths, any surplus energy or deficit energy as previously determined based on changes in energy of the aerial vehicle 210 or one or more other aerial vehicles (not shown), or from a map or other cartographic representation of such energy, or any other intrinsic or extrinsic factors, such as according to one or more traditional shortest path or shortest route algorithms such as Dijkstra's Algorithm, Bellman-Ford Algorithm, Floyd-Warshall Algorithm, Johnson's Algorithm or a hub labeling technique.

In some embodiments, the processor 212 and/or the server 282 may be configured to execute one or more machine learning systems or techniques. For example, in some embodiments, an artificial neural network or other machine learning system or technique may be trained to associate contents of imaging data captured from above a region, e.g., visual contrasts, surface features, topography, or terrain features, or others, and to associate such contents with sources or sinks of energy, e.g., energy surpluses or energy deficits. The artificial neural network or other machine learning system may be trained in a supervised or unsupervised manner, and may include any number of neurons in any number of layers, including an input layer, an output layer, and one or more intervening hidden layers. Each of the neurons in a layer within a neural network may receive an input and generate an output in accordance with an activation or energy function, with parameters corresponding to the various strengths or synaptic weights, e.g., in the form of a sigmoid function, wherein an output thereof may have a range of zero to one or 0 to 1, a hyperbolic tangent function, wherein an output thereof may have a range of negative one to positive one, or −1 to +1, or any others. A machine learning system, such as an artificial neural network, may be further trained using any information, data or metadata, including but not limited to imaging data.

The aerial vehicle 210 and/or the data processing system 280 may use any web-enabled or Internet applications or features, or any other client-server applications or features including E-mail or other messaging techniques, to connect to the network 290, or to communicate with one another. For example, the aerial vehicle 210 may be adapted to transmit information or data in the form of synchronous or asynchronous messages to the data processing system 280 or to any other computer device (e.g., to one or more other aerial vehicles) in real time or in near-real time, or in one or more offline processes, via the network 290. Those of ordinary skill in the pertinent art would recognize that the aerial vehicle 210 or the data processing system 280 may operate or be operated by any of a number of computing devices that are capable of communicating over the network, including but not limited to set-top boxes, mobile devices, laptop computers, desktop computers, electronic book readers, and the like. The protocols and components for providing communication between such devices are well known to those skilled in the art of computer communications and need not be described in more detail herein.

The data and/or computer-executable instructions, programs, firmware, software and the like (also referred to herein as "computer-executable" components) described herein may be stored on a computer-readable medium that is within or accessible by computers or computer components such as the processor 212, the servers 282 and/or the processors 284, or any other computers or control systems utilized by the aerial vehicle 210 or the data processing system 280 (e.g., by one or more other aerial vehicles), and having sequences of instructions which, when executed by a processor (e.g., a CPU or GPU), cause the processor to perform all or a portion of the functions, services and/or methods described herein. Such computer-executable instructions, programs, software, and the like may be loaded into the memory of one or more computers using a drive mechanism associated with the computer readable medium, such as a floppy drive, CD-ROM drive, DVD-ROM drive, network interface, or the like, or via external connections.

Some embodiments of the systems and methods of the present disclosure may also be provided as a computer-executable program product including a non-transitory machine-readable storage medium having stored thereon instructions (in compressed or uncompressed form) that may be used to program a computer (or other electronic device) to perform processes or methods described herein. The machine-readable storage media of the present disclosure may include, but is not limited to, hard drives, floppy diskettes, optical disks, CD-ROMs, DVDs, ROMs, RAMs, erasable programmable ROMs ("EPROM"), electrically erasable programmable ROMs ("EEPROM"), flash memory, magnetic or optical cards, solid-state memory devices, or other types of media/machine-readable medium that may be suitable for storing electronic instructions. Further, embodiments may also be provided as a computer-executable program product that includes a transitory machine-readable signal (in compressed or uncompressed form). Examples of machine-readable signals, whether modulated using a carrier or not, may include, but are not limited to, signals that a computer system or machine hosting or running a computer program can be configured to access, or including signals that may be downloaded through the Internet or other networks.

Figure 3:
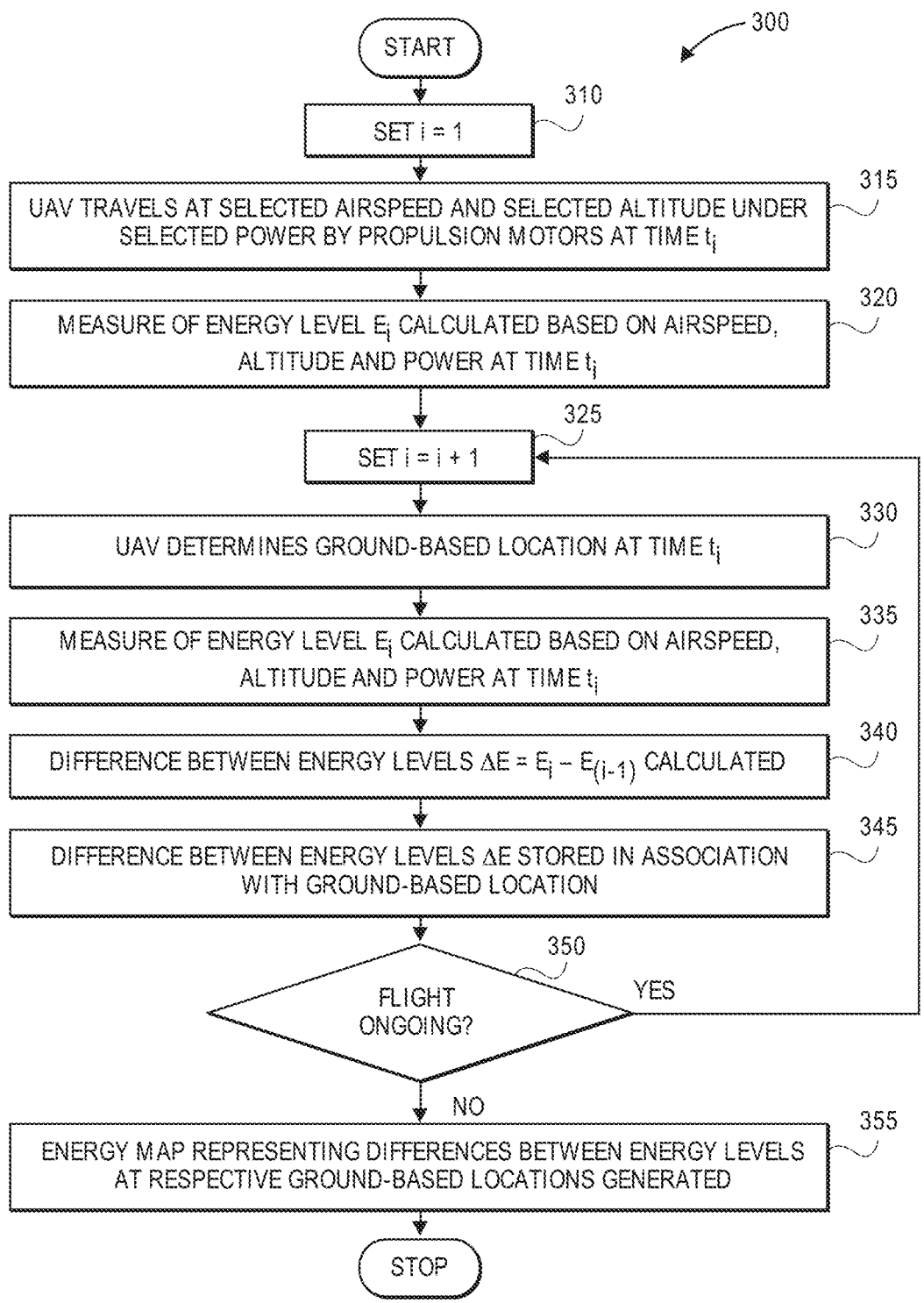
FIG. 3 is a flow chart of one process for engaging in efficient flight operations based on naturally present energy sources or sinks in accordance with embodiments of the present disclosure.

As is discussed above, a change in energy level of an aerial vehicle traveling through a region may be detected based on a change in altitude of the aerial vehicle, e.g., an increase or a decrease in altitude, or any other change in energy that may not be attributed to any operational changes in the aerial vehicle, such as starting or stopping one or more propulsion motors, or changing a speed in one or more propulsion motors. Such changes in energy may be presumed to originate with one or more naturally present energy sources or sinks, and locations at which such changes in energy are detected may be stored in association with one or more maps of the region. Referring to FIG. 3, a flow chart 300 of one process for engaging in efficient flight operations based on naturally present energy sources or sinks in accordance with embodiments of the present disclosure is shown. At box 310, a value of a step variable i is set equal to one, or i=1. At box 315, an unmanned aerial vehicle travels at a selected airspeed and at a selected altitude under a selected power level by one or more propulsion motors at time $t_i$. For example, the unmanned aerial vehicle may be programmed to travel along a route having one or more paths between an origin to a destination, by way of one or more intervening waypoints, and configured with one or more propulsion motors for generating lift and/or thrust.

At box 320, a measure of an energy level $E_i$ of the unmanned aerial vehicle at time $t_i$ is calculated based at least in part on the selected airspeed, the selected altitude and the selected power level. As is discussed above, an energy level of an unmanned aerial vehicle may be calculated as a sum of the kinetic energy and the potential energy of the unmanned aerial vehicle, less the work supplied to the aerial vehicle by the propulsion motors. For example, where an unmanned aerial vehicle having a mass m that is traveling at an airspeed V and an altitude z, the kinetic energy of the unmanned aerial vehicle is equal to one-half of a product of the mass m and a square of the airspeed V or $\frac{1}{2}mV^2$, and the potential energy of the unmanned aerial vehicle is equal to a product of the mass m, acceleration due to gravity g, and the altitude z, or mgz. Therefore, the energy level $E_i$ of the unmanned aerial vehicle at time $t_i$ is equal to the sum of the kinetic energy $\frac{1}{2}mV_i^2$ at time $t_i$ and the potential energy $mgz_i$ of the aerial vehicle at time $t_i$, less the work performed on the air surrounding the unmanned aerial vehicle operating at the selected power level at time $t_i$.

At box 325, the value of the step variable i is incremented by one, or i=i+1. At box 330, the unmanned aerial vehicle determines a ground-based location associated with the aerial vehicle at time $t_i$. For example, the unmanned aerial vehicle may determine a position of the unmanned aerial vehicle at time $t_i$ by one or more position sensors, e.g., a GPS sensor, and determine a geolocation or set of coordinates associated with the position using such sensors.

At box 335, a measure of an energy level $E_i$ of the unmanned aerial vehicle at time $t_i$ is calculated based at least in part on the airspeed, the altitude and the power level at time $t_i$. As is discussed above, an energy level $E_i$ of the unmanned aerial vehicle may be calculated as a sum of the kinetic energy $\frac{1}{2}mV^2$ and the potential energy $mgz$ of the unmanned aerial vehicle at time $t_i$, less the work supplied to the unmanned aerial vehicle by the propulsion motors at time $t_i$. Each of the velocity $V_1$ and the altitude $z_i$ may have remained constant from time $t_{(i-1)}$ to time $t_i$, or either the velocity $V_i$ or the altitude $z_i$ may have changed from time $t_{(i-1)}$ to time $t_i$. In some embodiments, the energy level $E_i$ of the unmanned aerial vehicle at time $t_i$ may be calculated based at least in part on a mass of the unmanned aerial vehicle, which may have also changed from time $t_{(i-1)}$ to time $t_i$ due to a release of one or more engaged items or for any other reason.

At box 340, a difference $\Delta E$ between the most recently calculated energy levels $E_i$ and $E_{(i-1)}$ is calculated. At box 345, the difference $\Delta E$ calculated at box 340 is stored in association with the ground-based location determined at box 330. In some embodiments, a geolocation (e.g., set of coordinates) may be stored in association with a quantitative indicator of the difference $\Delta E$, e.g., an amount or a magnitude of the difference $\Delta E$. In some embodiments, the geolocation may be stored with a qualitative indication that a difference in energy levels, either positive or negative, was encountered at the geolocation.

At box 350, whether the unmanned aerial vehicle continues in flight is determined. For example, where the unmanned aerial vehicle is programmed or instructed to travel from an origin to a destination, either directly or by way of one or more intervening waypoints, the unmanned aerial vehicle may be specifically configured for the single purpose of monitoring for changes in energy levels, or, alternatively, may monitor for changes in energy levels during the performance of one or more other tasks or missions.

If the unmanned aerial vehicle continues in flight, however, then the process returns to box 325, where the value of the step variable i is incremented by one, or i=i+1. If the unmanned aerial vehicle does not continue in flight, then the process advances to box 355, where an energy map representing the differences $\Delta E$ between the energy levels calculated at box 345 at the respective ground-based locations determined at box 335 is generated, and the process ends.

In accordance with some embodiments of the present disclosure, the differences in energy levels may be calculated and the locations of the unmanned aerial vehicle associated with such differences may be determined in real time, or in near-real time, e.g., by one or more processors aboard the unmanned aerial vehicle or, alternatively, by one or more external data processing systems, as the unmanned aerial vehicle is engaged in one or more flight operations. For example, airspeeds, altitudes, power levels and/or locations of the unmanned aerial vehicle may be transmitted to one or more external data processing systems wirelessly as the unmanned aerial vehicle is in flight, and differences in energy levels of the unmanned aerial vehicle may be detected and stored in association with ground-based locations while the unmanned aerial vehicle remains in flight. Alternatively, the differences in energy levels may be calculated and the locations of the unmanned aerial vehicle associated with such differences may be determined after the unmanned aerial vehicle has completed one or more operations, e.g., by one or more processors aboard the unmanned aerial vehicle, or by one or more external data processing systems.

Figure 4A:
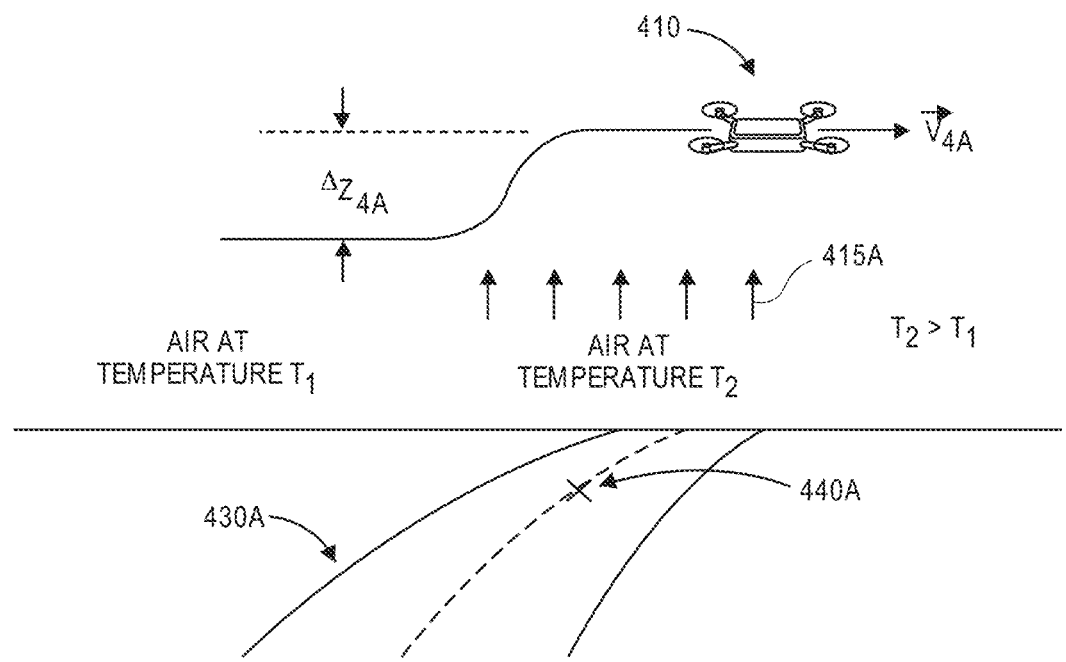
FIGS. 4A through 4C are views of aspects of systems for engaging in efficient flight operations based on naturally present energy sources or sinks in accordance with embodiments of the present disclosure.
Figure 4B:
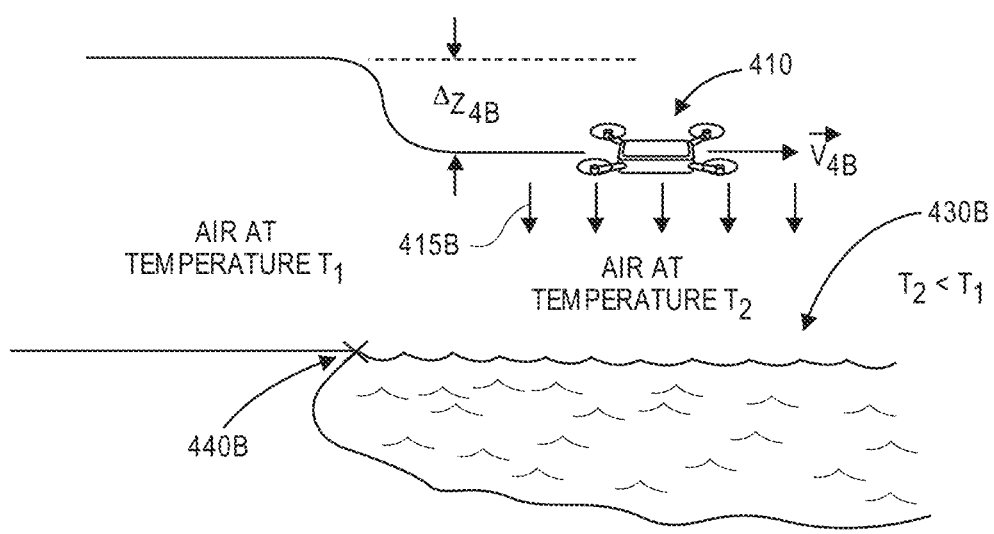
Figure 4C:
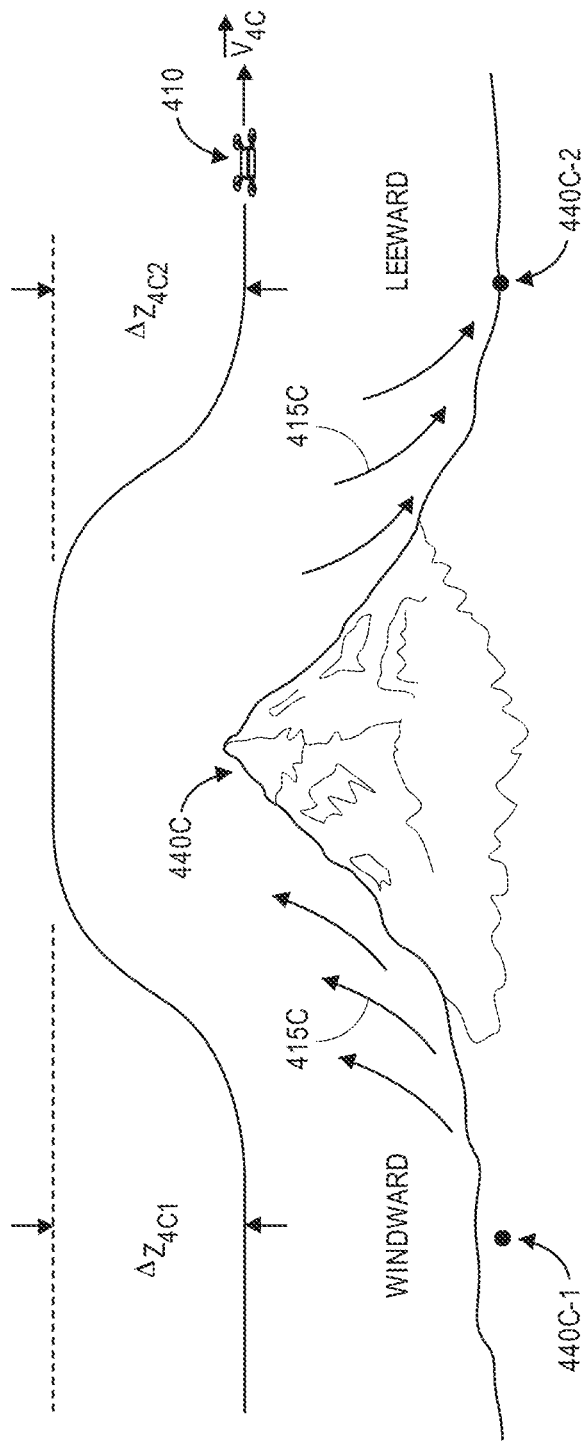

Energy sources or sinks that are naturally present within a region may take any number of forms. Referring to FIGS. 4A through 4C, views of aspects of systems for engaging in efficient flight operations based on naturally present energy sources or sinks in accordance with embodiments of the present disclosure are shown. Except where otherwise noted, reference numerals preceded by the number "4" shown in FIGS. 4A through 4C indicate components or features that are similar to components or features having reference numerals preceded by the number "2" shown in FIG. 2 or by the number "1" shown in FIGS. 1A through 1D.

As is shown in FIG. 4A, an aerial vehicle 410 traveling at a velocity $v_{4A}$ through air at a temperature $T_1$ passes over a road 430A at a location 440A. Air 415A above the road 430A has a temperature $T_2$ that is greater than $T_1$, e.g., due to heating by solar radiation, conduction from traffic passing thereon, or any other source. The air 415A above the road 430A expands and rises, e.g., in a thermal column, imparting energy upon the aerial vehicle 410, and causing the aerial vehicle 410 to experience an increase $\Delta z_{4A}$ in altitude. In accordance with some embodiments of the present disclosure, the location 440A of the increase $\Delta z_{4A}$ in altitude may be stored in one or more data stores. A map or other cartographic representation of naturally present energy within a region through which the road 430A passes may include the location 440A as a source of energy, e.g., positive energy. Alternatively, an amount of the naturally present energy available at the location 440A may be estimated based on the increase $\Delta z_{4A}$ in altitude, and also stored in association with the location 440A or included in a map of naturally present energy within the region.

As is shown in FIG. 4B, the aerial vehicle 410 travels over land at a velocity $v_{4B}$ through air at a temperature $T_1$ before reaching a body of water 430B at a location 440B. Air 415B above the body of water 430B has a temperature $T_2$ that is less than $T_1$, e.g., due to cooling from evaporation by the body of water 430B, or any other source. The air 415B above the body of water 430B contracts and descends, thereby withdrawing energy from the aerial vehicle 410, and causing the aerial vehicle 410 to experience a decrease $\Delta z_{4B}$ in altitude. A map or other cartographic representation of naturally present energy within a region including the body of water 430B may include the location 440B as corresponding to a sink of energy, e.g., negative energy. Alternatively, an amount of the naturally present energy available at the location 440B may be estimated based on the decrease $\Delta z_{4B}$ in altitude, and also stored in association with the location 440B or included in a map of naturally present energy within the region.

As is shown in FIG. 4C, the aerial vehicle 410 travels over a hill at a location 440C. A flow of air 415C on a windward side 440C-1 of the hill 430C causes an updraft, while the flow of the air 415C on a leeward side of the hill causes a downdraft. The updraft on the windward side of the hill imparts energy upon the aerial vehicle 410, and causes the aerial vehicle to experience an increase $\Delta z_{4C1}$ in altitude. The downdraft on the leeward side of the hill withdraws energy upon the aerial vehicle 410, and causes the aerial vehicle to experience a decrease $\Delta z_{4C2}$ in altitude. A map or other cartographic representation of naturally present energy within a region including the hill may include areas on the windward side 440C-1 of the location 440C as corresponding to a source of energy, e.g., positive energy, and may also include areas on the leeward side 440C-2 of the location 440C as corresponding to a sink of energy, e.g., negative energy. Alternatively, amounts of the naturally present energy available on either side of the location 440C may be estimated based on the increase $\Delta z_{4C1}$ and the decrease $\Delta z_{4C2}$ in altitude, respectively, which may also be stored in association with the location 440C or included in a map of naturally present energy within the region.

Figure 5A:
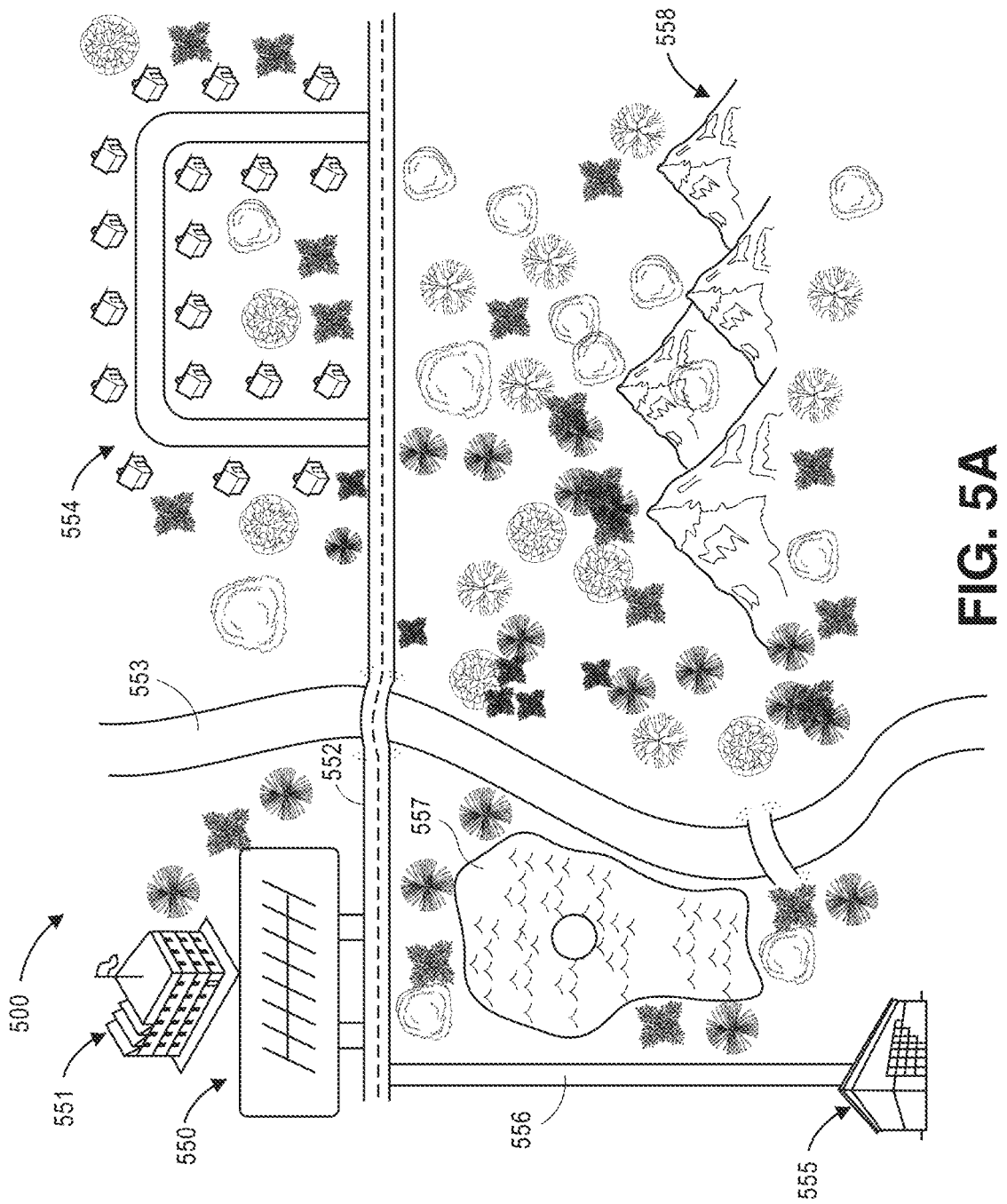
FIGS. 5A and 5B are views of aspects of one system for engaging in efficient flight operations based on naturally present energy sources or sinks in accordance with embodiments of the present disclosure.
Figure 5B:
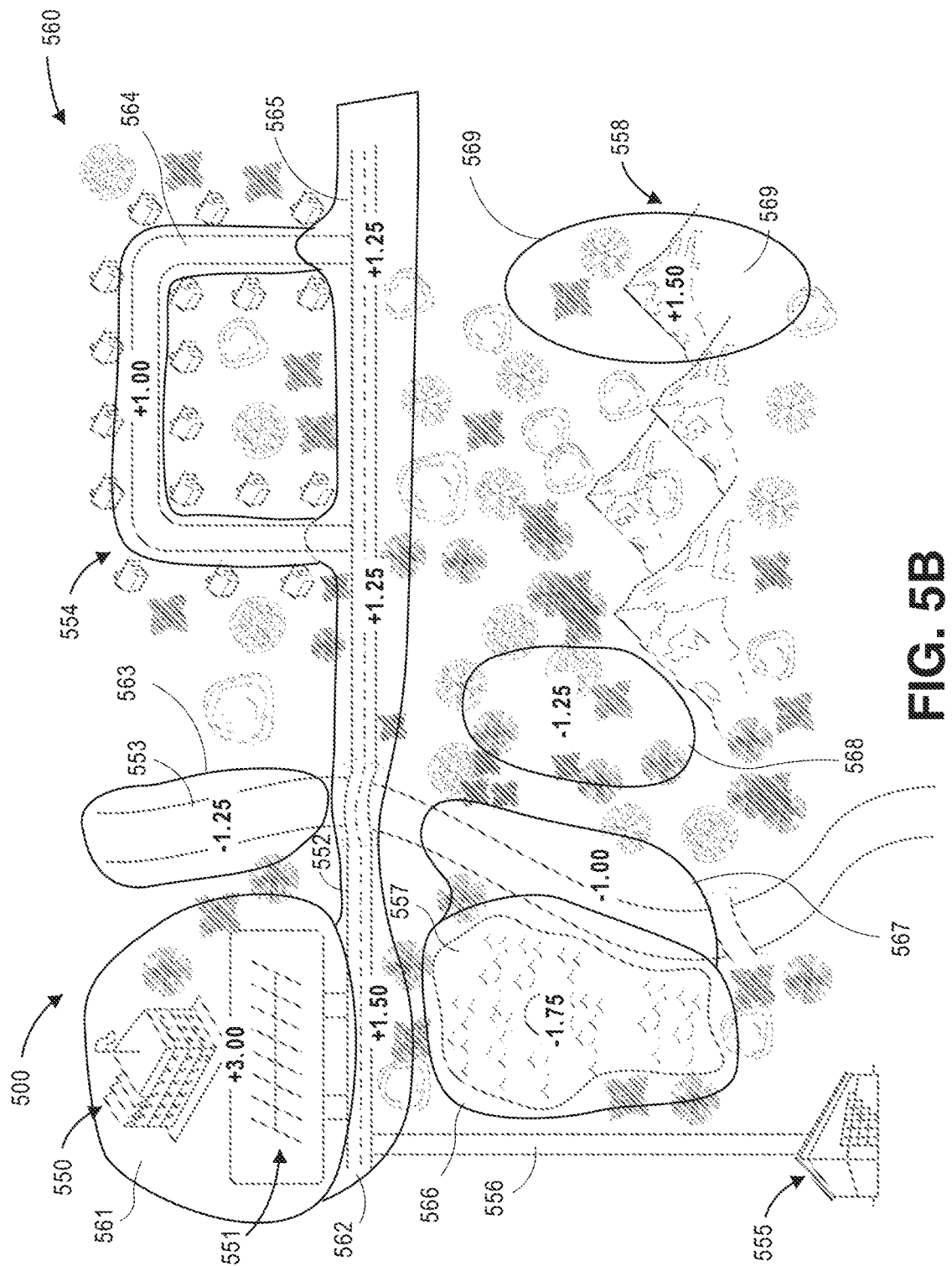

As is discussed above, locations of naturally present energy sources or sinks within a region, e.g., surpluses or deficits of energy, may be plotted or otherwise depicted on a map or other cartographic representation of the region. Referring to FIGS. 5A and 5B, views of aspects of one system for engaging in efficient flight operations based on naturally present energy sources or sinks in accordance with embodiments of the present disclosure are shown. Except where otherwise noted, reference numerals preceded by the number "5" shown in FIGS. 5A and 5B indicate components or features that are similar to components or features having reference numerals preceded by the number "4" shown in FIGS. 4A through 4C, by the number "2" shown in FIG. 2 or by the number "1" shown in FIGS. 1A through 1D.

As is shown in FIG. 5A, a map 550 of a region 500 depicts a school 551, a road 552 (or other way), a river 553 (or other watercourse), a neighborhood 554 (or other collection of dwellings), a fulfillment center 555, a driveway 556 (or other way), a lake 557 (or other body of water) and a set of hills 558 (or other terrain features). The school 551 is accessible by the road 552, and includes a parking lot. The road 552 is provided for traveling by vehicles or pedestrians, and may be paved, formed from gravel or dirt, or comprised of any other substance. The river 553 enables the flow of water in one or more directions, and is traversed by the road 552, e.g., by a bridge or other structure. The neighborhood 554 includes a plurality of single-family dwellings, multi-family dwellings, or any other facilities or structures. The fulfillment center 555 is a facility that is adapted to receive, store, process and/or distribute items, including but not limited to warehouses, distribution centers, cross-docking facilities, order fulfillment facilities, packaging facilities, shipping facilities, rental facilities, libraries, retail stores or establishments, wholesale stores, museums, or other facilities. The fulfillment center 555 is accessible by the driveway 556, which connects the fulfillment center 555 to the road 552. The lake 557 is a natural or artificial body of water surrounded by land. The set of hills 558 include one or more forms of land having heights or elevations that extend above heights or elevations of surrounding land.

As is discussed above, naturally present energy sources or sinks, e.g., surpluses of energy or deficits of energy, may be detected based on changes in elevation of aerial vehicles that cannot be attributed to operational changes (e.g., changes in speeds of propulsion motors and/or positions or angles of control surfaces, or other factors) of the aerial vehicle. Such changes in elevation may be caused by variations in air flow (e.g., wind), which may be initiated by differences in temperature or pressure of air surrounding the aerial vehicle, or variations in underlying terrain. As is shown in FIG. 5B, an energy map 560 shows areas or sectors 561, 562, 563, 564, 565, 566, 567, 568, 569 of energy sources or sinks, e.g., surpluses of energy or deficits of energy, within the region 500. For example, the energy map 560 includes an area 561 of surplus energy associated with the school 551. The area 561 may have been identified as having surplus energy based on comparatively greater air temperature variations, e.g., from solar radiative heating of the parking lot or other surfaces associated with the school 551, which may cause the parking lot or such other surfaces to be warmed to a greater extent during daylight hours and cooled overnight, e.g., in the absence of sunlight. Alternatively, the surplus energy associated with the area 561 may exist for any other reason, and need not be solely based on variations in air temperatures. Furthermore, an amount or magnitude of surplus energy associated with the area 561 may be determined or estimated on any basis, including but not limited to an amount of an altitude change, an air flow gradient in any direction (e.g., upward or downward), colors or textures of surfaces at the school 551, or the like. For example, where an aerial vehicle having a mass m experiences a change in altitude $\Delta z$ that is not associated with any change in operation of the aerial vehicle while traveling over the school 551, one measure of a specific energy surplus that is naturally present at the area 561 is to calculate a change in potential energy based on the change in altitude $\Delta z$, and to divide the change in potential energy by the mass m of the aerial vehicle. Any technique for estimating an amount or a magnitude of an energy surplus or energy deficit that is present at a given location may be utilized in generating energy maps or other representations in accordance with the present disclosure.

The energy map 560 further includes an area 562 of surplus energy associated with a portion of the road 552 adjacent to the school 551. The area 562 may have also been identified as having surplus energy based on air temperature variations, which may be comparatively greater than variations over surrounding areas or sectors due to solar radiative heating of the road 552, but less than variations observed over the school 551 and the parking lot.

The energy map 560 also includes an area 563 of an energy deficit over the river 553, or near transitions where the river 553 contacts land, which may have been identified as having an energy deficit based on comparatively lower temperature variations, such as where radiative heating of the river 553 by the sun is less than radiative heating of the surrounding land. The energy map 560 further includes areas 564, 565 of energy surpluses over the neighborhood 554 and the road 552 adjacent to the neighborhood 554, which may have comparatively greater air temperature variations from solar radiative heating of the road 552 or other surfaces within the neighborhood 554, as compared to land surrounding the neighborhood 554. The energy map 560 also includes areas 566, 567 of energy deficits over the lake 557 and the river 553, which may have comparatively lower temperature variations than surrounding areas or sectors of the land.

The energy map further includes an area 568 of surplus energy on a windward side of the set of hills 558, and an area 569 of deficit energy on a leeward side of the set of hills 559. The area 568 of surplus energy may result from air flow passing over the set of hills 559, which may cause upward drafts and/or waves on the windward side of such obstructions. Conversely, the area 569 of deficit energy may result from downward drafts and/or waves on the leeward side of such obstructions.

As is discussed above with regard to the area 561, the amounts or magnitudes of energy surpluses or energy deficits associated with the areas 562, 563, 564, 565, 566, 567, 568, 569 of the energy map 560 may be determined or estimated on any basis.

Figure 6:
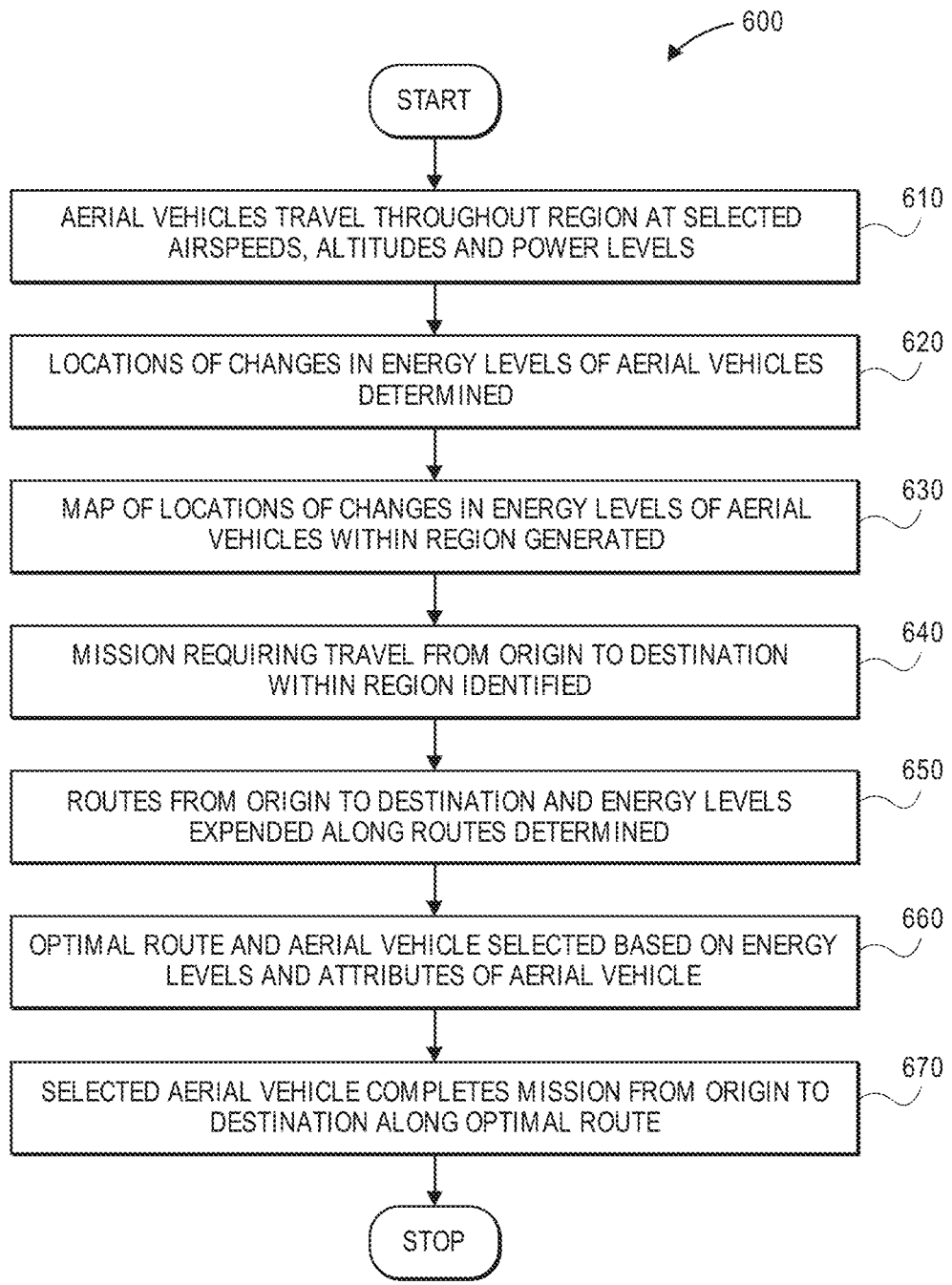
FIG. 6 is a flow chart of one process for engaging in efficient flight operations based on naturally present energy sources or sinks in accordance with embodiments of the present disclosure.

A map or other cartographic representation of energy sources or sinks within a region may be used to select one or more optimal paths or routes of an aerial vehicle. For example, an aerial vehicle may be programmed to travel over areas or sectors that are associated with energy surpluses, and programmed to avoid areas or sectors that are associated with energy deficits. Referring to FIG. 6, a flow chart 600 of one process for engaging in efficient flight operations based on naturally present energy sources or sinks in accordance with embodiments of the present disclosure is shown. At box 610, aerial vehicles travel throughout a region at selected airspeeds, altitudes and power levels. For example, the aerial vehicles may be programmed or configured to perform one or more missions having any purpose or intended result within the region. At box 620, locations of changes in energy levels of the aerial vehicles are determined. For example, energy levels of aerial vehicles may be calculated at specific times based on their respective masses, airspeeds and altitudes, e.g., as sums of kinetic and potential energies, less the contributions of work provided by the propulsion motors at their respective power levels. Locations at which such changes are observed may be determined using one or more position sensors or other techniques (e.g., dead reckoning).

At box 630, a map of locations of changes in energy levels within the region is generated. The map may include specific points at which such changes are observed, or areas or sectors of the region associated with such changes. Alternatively, the map may include one or more measures associated with values of changes in energy levels. For example, referring to FIG. 1C, where an observed difference in energy levels $E_2-E_1$ is attributed exclusively to a difference in altitude $\Delta z=z_2-z_1$, a magnitude of the difference in energy may be calculated as a product of a mass of an aerial vehicle, acceleration due to gravity, and the difference in altitude $\Delta z$. Such differences may be stored in association with the locations of the changes in energy levels and included in the map.

At box 640, a mission requiring travel from an origin to a destination within the region is identified. The mission may have any purpose or objective, or multiple purposes or objectives, such as a delivery of a parcel from an origin to a destination, or monitoring operations within a vicinity of the origin or the destination, or in areas between the origin and the destination. The aerial vehicles of the present disclosure are not limited to any of missions or embodiments disclosed herein. At box 650, routes from the origin to the destination and energy levels to be expended along the routes are determined. The routes may consist of a single path between the origin and the destination, e.g., on a straight line, or multiple paths between the origin and the destination, e.g., by way of one or more intervening waypoints. The energy levels may be determined based on the map, or on prior travels within the region by one or more other aerial vehicles. Alternatively, times associated with each of the routes or paths, net distances to be traveled along each of the routes or paths, or operating restrictions of areas within a vicinity of any of the routes or paths may also be determined.

At box 660, an optimal route and an aerial vehicle are selected based on the energy levels and attributes of available aerial vehicles. A route may be determined to be "optimal" according to any shortest path or shortest route algorithms, or any other techniques, based on the amount of energy expended along the respective routes from the origin to the destination. An aerial vehicle may exploit the presence or absence of energy surpluses or energy deficits for any reason during flight operations. For example, a route may include at least one intervening waypoint within an area identified as having a naturally present energy surplus, and the intervening waypoint may be selected based on any information or data regarding one or more operational constraints of the aerial vehicle during the mission.

Alternatively, a route may be determined to be "optimal" based on any factor or element including but not limited to times required to travel on any paths of the route, any costs associated with traveling on the paths, or any other factors. Similarly, an aerial vehicle may be selected on any basis, including but not limited to one or more dimensions (e.g., heights, lengths, widths), operating characteristics (e.g., power levels, speeds, ranges, carrying volumes or weight limits) of the aerial vehicle, or may be identified in a look-up table or other data file or record. At box 670, the selected aerial vehicle completes the mission from the origin to the destination along the optimal route, and the process ends.

Figure 7A:
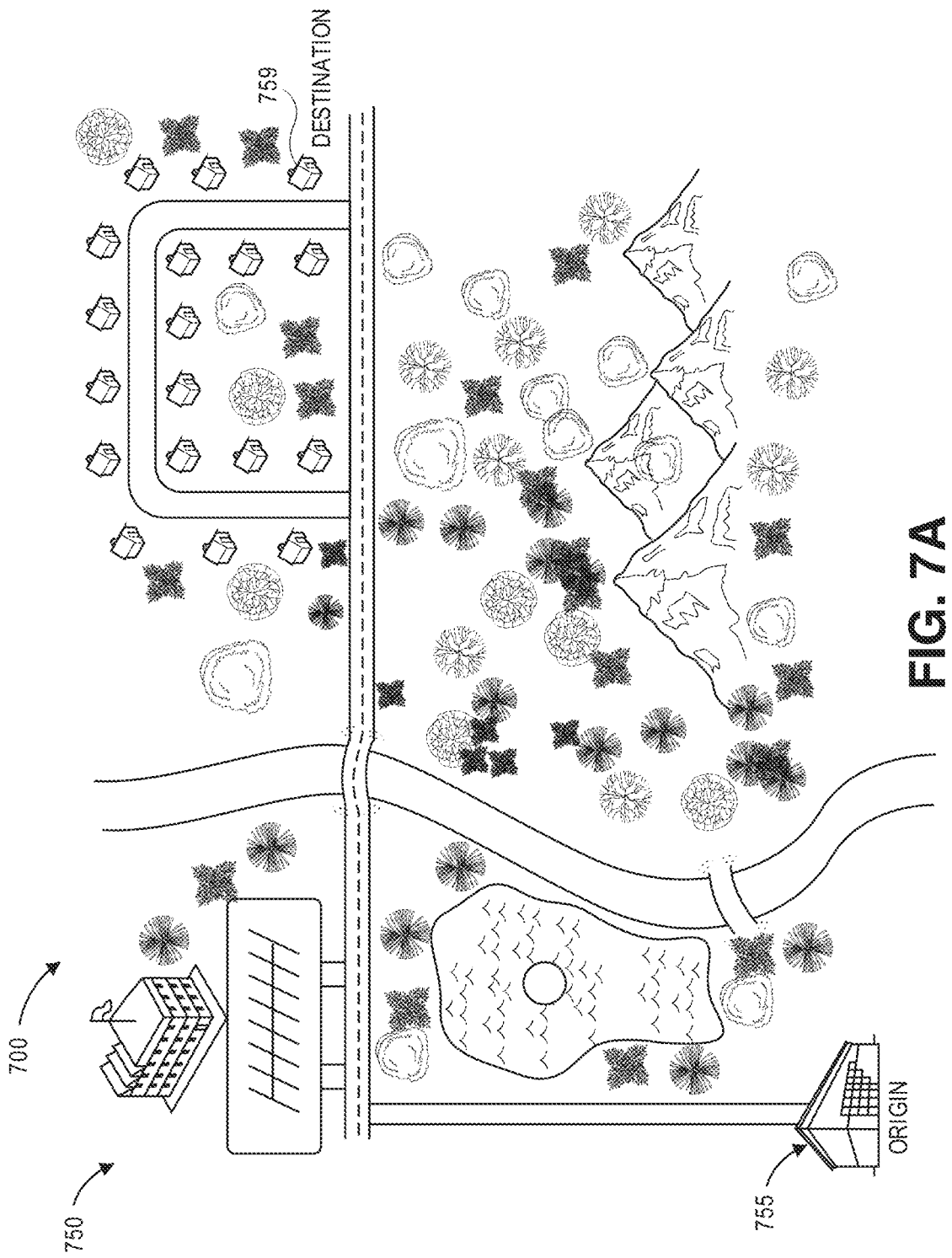
FIGS. 7A and 7B are views of aspects of one system for engaging in efficient flight operations based on naturally present energy sources or sinks in accordance with embodiments of the present disclosure.
Figure 7B:
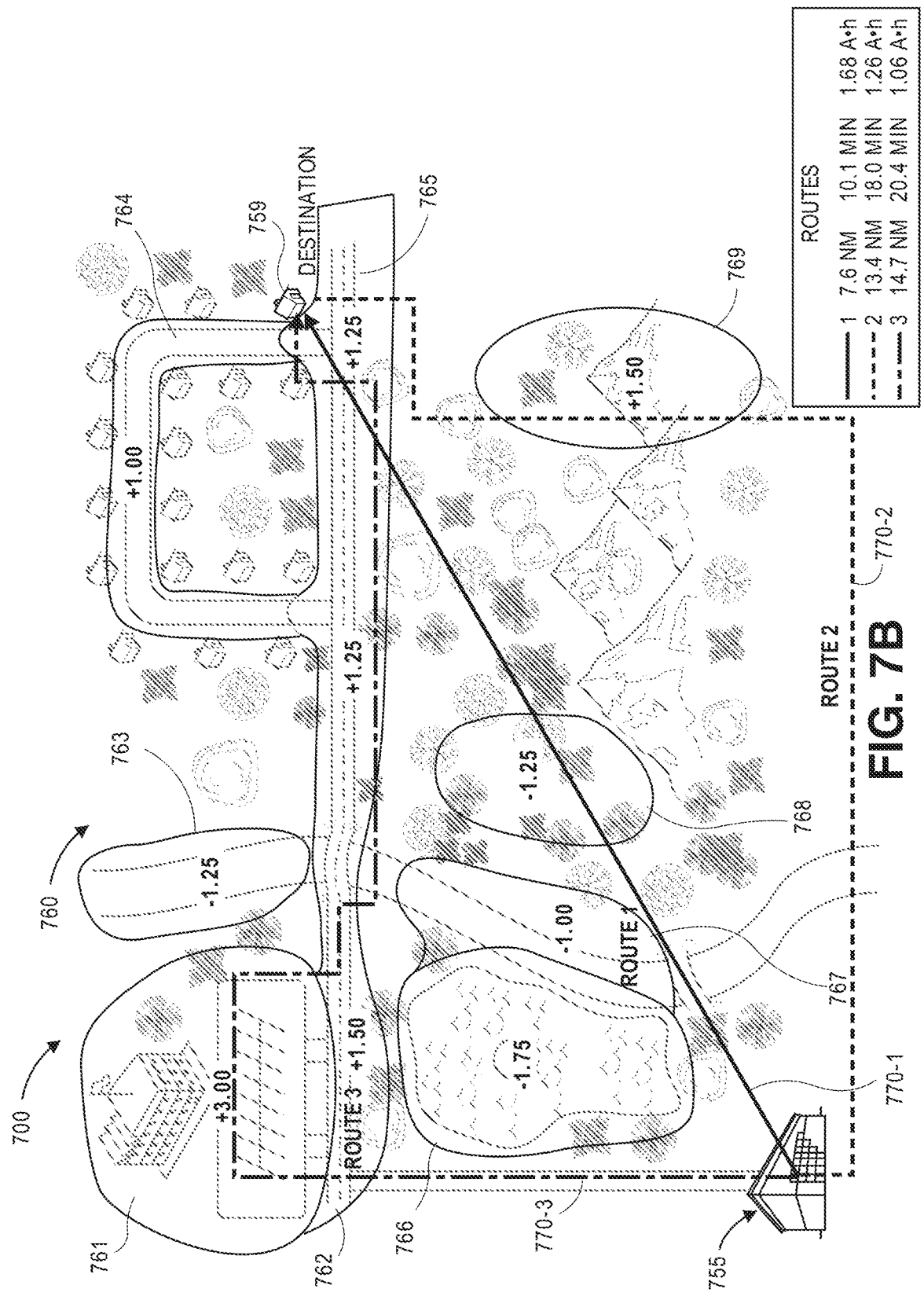

Referring to FIGS. 7A and 7B, views of aspects of one system for engaging in efficient flight operations based on naturally present energy sources or sinks in accordance with embodiments of the present disclosure are shown. Except where otherwise noted, reference numerals preceded by the number "7" shown in FIGS. 7A and 7B indicate components or features that are similar to components or features having reference numerals preceded by the number "5" shown in FIGS. 5A and 5B, by the number "4" shown in FIGS. 4A through 4C, by the number "2" shown in FIG. 2 or by the number "1" shown in FIGS. 1A through 1D.

As is shown in FIG. 7A, a map 750 of a region 700 is shown. The map 750 includes an origin 755 (viz., a fulfillment center) and a destination 759 (viz., a dwelling), as well as a number of different infrastructure features, plant life, terrain, watercourses and bodies of water. The map 750 of the region 700 shown in FIG. 7A is similar to the map 550 of the region 500 shown in FIG. 5A.

In accordance with embodiments of the present disclosure, where a mission requires travel from an origin to a destination within a region, viz., from the origin 755 to the destination 759, by an aerial vehicle, routes for performing the mission may be selected on any basis. For example, a route may be selected based on the availability of one or more energy sources or sinks, e.g., energy surpluses or deficits, within the region. As is shown in FIG. 7B, an energy map 760 of the region 700 is shown. The energy map 760 shown in FIG. 7B is similar to the energy map 560 of the region 500 shown in FIG. 5B.

The energy map 760 shows areas or sectors 761, 762, 764, 765, 769 where surpluses of energy are present, and areas or sectors 763, 766, 767, 768 where deficits of energy are present. As is discussed above with regard to the energy map 560 of FIG. 5B, the amounts or magnitudes of energy surpluses or energy deficits associated with the areas 761, 762, 763, 764, 765, 766, 767, 768, 769 of the energy map 760 may be determined or estimated on any basis.

As is further shown in FIG. 7B, the energy map 760 shows a plurality of routes 770-1, 770-2, 770-3 extending between the origin 755 and the destination 759. The route 770-1 has a shortest distance between the origin 755 and the destination 759 of each of the three routes 770-1, 770-2, 770-3, viz., 7.6 nautical miles, and an aerial vehicle may travel from the origin 755 to the destination 759 via the route 770-1 in the shortest amount of time of the three routes 770-1, 770-2, 770-3, viz., 10.1 minutes. The route 770-2 is the next-shortest route of the three routes 770-1, 770-2, 770-3, viz., 13.4 nautical miles, and an aerial vehicle may travel from the origin 755 to the destination 759 via the route 770-2 in the next-shortest amount of time, viz., 18.0 minutes, of the three routes 770-1, 770-2, 770-3. The route 770-3 is the longest of the three routes 770-1, 770-2, 770-3, viz., 14.7 nautical miles, and an aerial vehicle may travel from the origin 755 to the destination 759 via the route 770-3 in the longest amount of time, viz., 20.4 minutes, of the three routes 770-1, 770-2, 770-3.

However, traveling on the route 770-1, which has the shortest distance of the three routes 770-1, 770-2, 770-3, would require an aerial vehicle to expend the most energy of the three routes 770-1, 770-2, 770-3, or 1.68 ampere-hours. The route 770-1 passes over an area 767 where an energy deficit is present, and over an area 768 where an energy deficit is also present. Traveling on the route 770-2, which has the next-shortest distance of the three routes 770-1, 770-2, 770-3, and would require an aerial vehicle to travel for nearly seven minutes longer than on the route 770-1, would require the aerial vehicle to expend 1.26 ampere-hours, or just seventy-five percent of the energy required to travel on the route 770-1. Traveling on the route 770-3, has the longest distance of the three routes 770-1, 770-2, 770-3, and would require an aerial vehicle to travel for 2.4 minutes longer than on the route 770-2, or nearly twice as long as the route 770-1. Traveling on the route 770-3 would also require the aerial vehicle to expend just 1.06 ampere-hours, or approximately sixty-three percent of the energy required to travel on the route 770-1, or approximately eighty-four percent of the energy required to travel on the route 770-2.

The presence of one or more energy sources or sinks, e.g., energy surpluses or energy deficits, within a region may be utilized to select one or more routes within the region. Where time or distance are primary considerations, the route 770-1 or, alternatively, the route 770-2 may be selected. Where time or distance are not primary considerations, however, the route 770-3 or, alternatively, the route 770-2 may be selected in order to conserve energy, and to exploit the energy sources or sinks that are available along the route 770-3 or the route 770-2.

Figure 8:
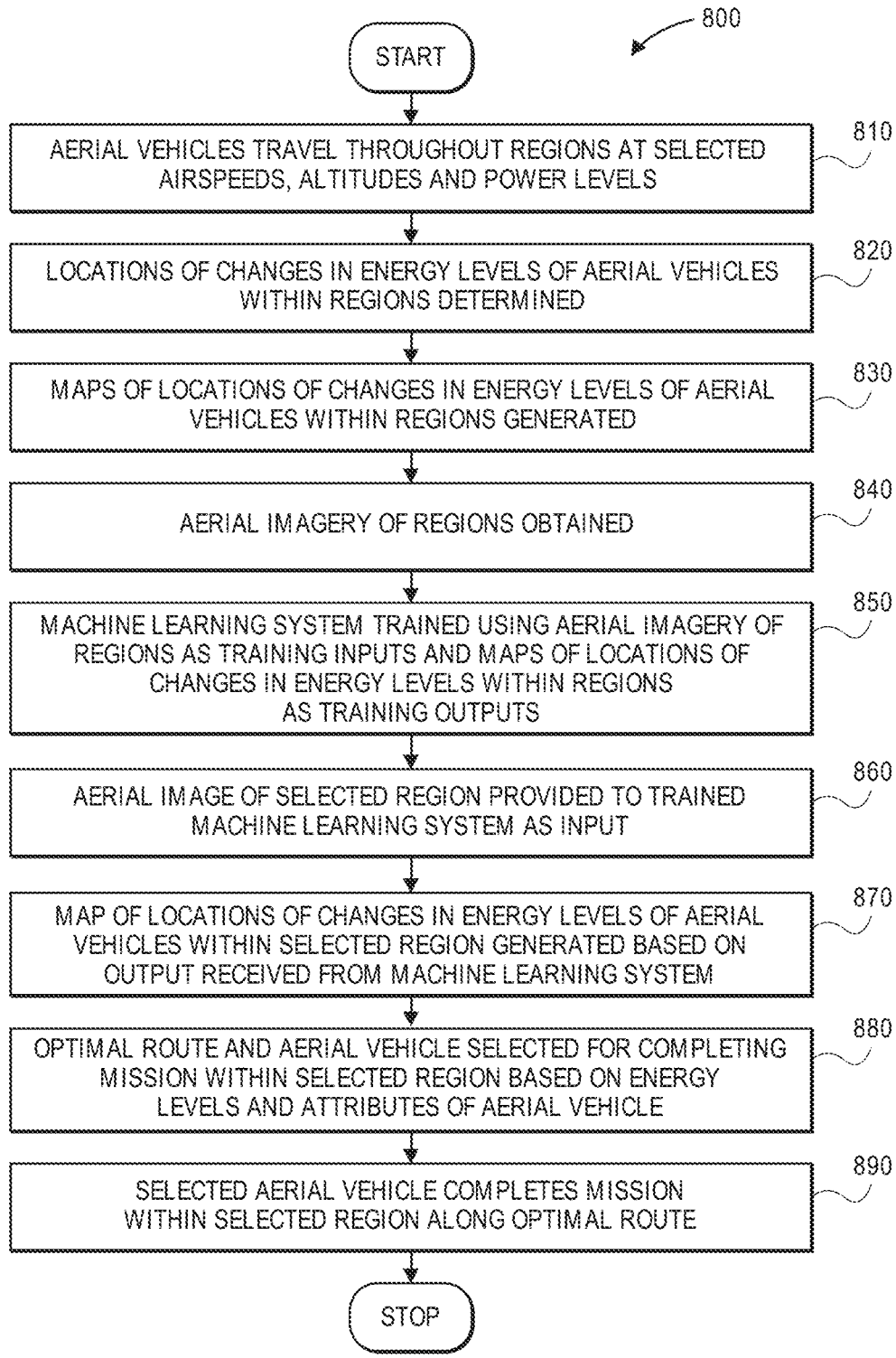
FIG. 8 is a flow chart of one process for engaging in efficient flight operations based on naturally present energy sources or sinks in accordance with embodiments of the present disclosure.

In accordance with the present disclosure, a machine learning tool may be trained using images of regions, and maps or other cartographic representations of naturally present energy sources or sinks within such regions. Once the machine learning tool is adequately trained, a map or other cartographic representation of naturally present energy sources or sinks within a region may be generated based on an output received from the machine learning tool in response to providing an image of the region to the machine learning tool as an input. Referring to FIG. 8, a flow chart 800 of one process for engaging in efficient flight operations based on naturally present energy sources or sinks in accordance with embodiments of the present disclosure is shown. At box 810, aerial vehicles travel throughout regions at selected airspeeds, altitudes and power levels, e.g., during the performance of one or more missions within the region having any purpose or intended result. At box 820, locations of changes in energy levels of the aerial vehicles within the regions are determined based on their respective masses, airspeeds and altitudes at specific times, less the contributions of work provided by the propulsion motors at their respective power levels at such times.

At box 830, maps of locations of changes in energy levels within the regions are generated, including specific points at which such changes are observed, or areas or sectors of the region associated with such changes and, alternatively, one or more measures associated with values of changes in energy levels.

At box 840, aerial imagery of the regions is obtained. The aerial imagery may be obtained from one or more aerial vehicles (e.g., airplanes, airships, blimps, dirigibles, drones), orbiting satellites, or other sources. The aerial imagery may be obtained at any desired level of resolution, and may have been captured in color, grayscale or black-and-white. In some embodiments, the aerial imagery may be stock images or photos that were obtained previously and independently, e.g., from sources other than the aerial vehicles that traveled through the region at box 810. In some other embodiments, the aerial imagery may have been captured by such aerial vehicles during such operations.

At box 850, a machine learning system is trained using the aerial imagery of the regions obtained at box 840 as training inputs, and the maps of the locations of the changes in energy levels within the regions generated at box 830 as training outputs. For example, in some embodiments, the machine learning system may be trained by supervised learning, e.g., by providing an image of a region to the machine learning system as a training input and providing the map of the locations of the changes in the energy levels to the machine learning system as a training output, thereby training the machine learning system to associate aspect of the images with the locations of energy surpluses or energy deficits, as represented within the maps. A test set, or a validation set, of images of regions and maps of corresponding regions may be set aside and used to determine whether the machine learning system is adequately trained, or whether further training is required. Alternatively, the machine learning system may be trained in an unsupervised manner. Those of ordinary skill in the pertinent art would recognize that any algorithm or method may be used to train one or more machine learning systems, e.g., to determine and minimize errors in an output of such systems.

At box 860, an aerial image of a selected region is provided to the trained machine learning system as an input, and at box 870, a map of locations of energy sources or sinks is generated based on an output received from the trained machine learning system. The map may identify locations of surplus energy, or locations of energy deficits, by specific points or using one or more areas or sectors of the selected region. Additionally, in some embodiments, the machine learning system may be trained to estimate or predict magnitudes associated with energy surpluses or energy deficits within the region, and such magnitudes may be included in the map generated at box 870. The aerial image of the region may have been obtained prior to or at a time when a map of energy sources or sinks within the region is desired, or at any other time. For example, the aerial image of the region may have been recently captured, e.g. up-to-date, or captured at another time, such as at a similar time in the past, or during the same season in a prior year. At box 880, an optimal route and an aerial vehicle are selected for performing a mission within the region based on the energy levels and attributes of the aerial vehicle. The optimal route may be selected on any basis or factor, such as to minimize energy expended by the selected aerial vehicle, or any other bases or factors such as distances, times, or operating restrictions. At box 890, the selected aerial vehicle completes the mission within the region by traveling along the optimal route, and the process ends.

In accordance with some embodiments of the present disclosure, maps of energy sources or sinks, e.g., energy surpluses or energy deficits, may be generated based on outputs received from one or more machine learning systems, e.g., artificial neural networks, that are trained to identify locations of energy surpluses or energy deficits within regions based on images of such regions. Referring to FIGS. 9A through 9E, views of aspects of one system for engaging in efficient flight operations based on naturally present energy sources or sinks in accordance with embodiments of the present disclosure are shown. Except where otherwise noted, reference numerals preceded by the number "9" shown in FIGS. 9A through 9E indicate components or features that are similar to components or features having reference numerals preceded by the number "7" shown in FIGS. 7A and 7B, by the number "5" shown in FIGS. 5A and 5B, by the number "4" shown in FIGS. 4A through 4C, by the number "2" shown in FIG. 2 or by the number "1" shown in FIGS. 1A through 1D.

Figure 9A:
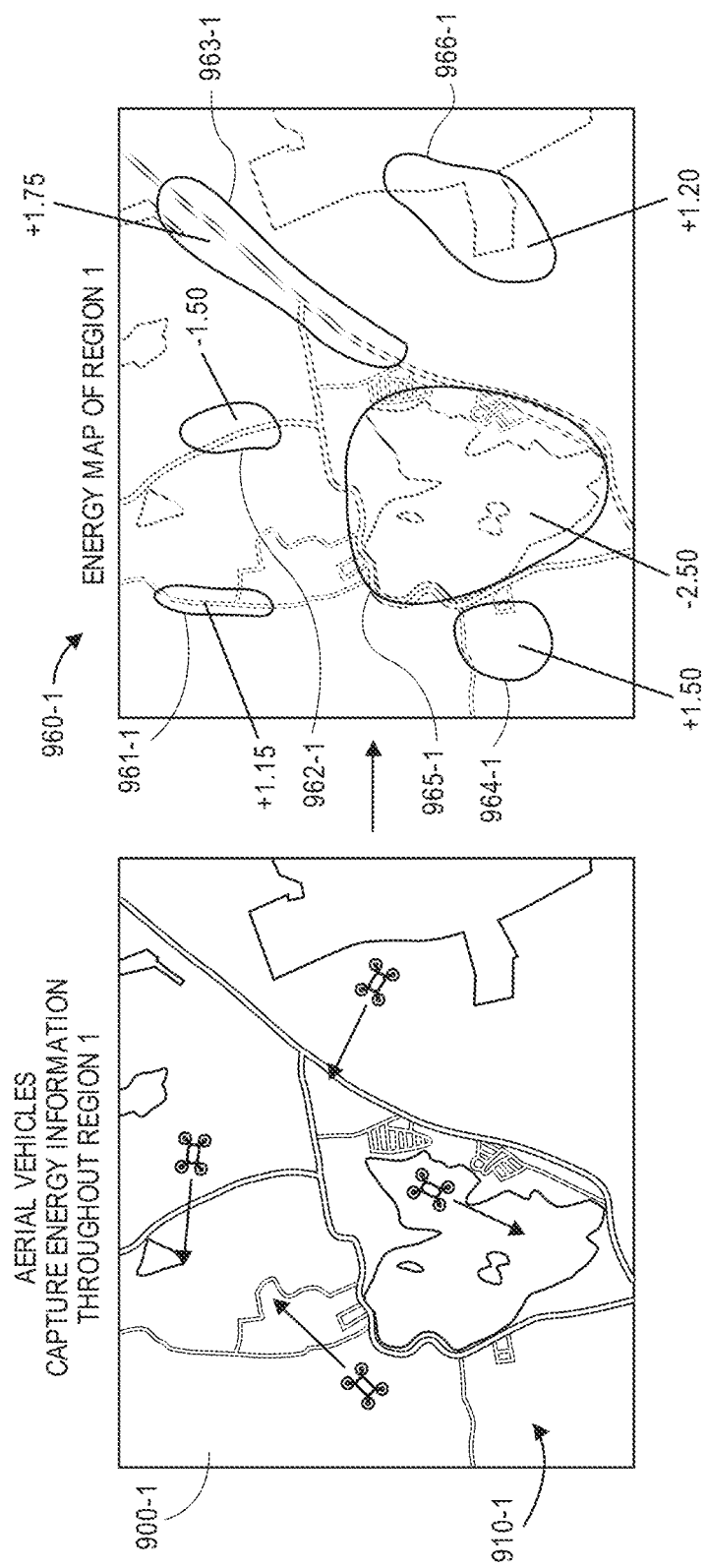
FIGS. 9A through 9E are views of aspects of one system for engaging in efficient flight operations based on naturally present energy sources or sinks in accordance with embodiments of the present disclosure.

As is shown in FIG. 9A, one or more aerial vehicles 910-1 capture energy information while traveling throughout a region 900-1. The energy information may include airspeeds, altitudes or masses of the respective aerial vehicles 910-1, as well as work performed by propulsion motors aboard the aerial vehicles 910-1. Using the captured information, total energy levels of the aerial vehicles 910-1 may be calculated, and an energy map 960-1 of the region 900-1 may be generated based on locations of increases or decreases in total energy levels within the region 900-1. For example, the energy map 960-1 includes a plurality of areas or sectors 961-1, 963-1, 964-1, 966-1 where energy surpluses are present within the region 900-1, and a plurality of areas or sectors 962-1, 965-1 where energy deficits are present within the region 900-1.

Figure 9B:
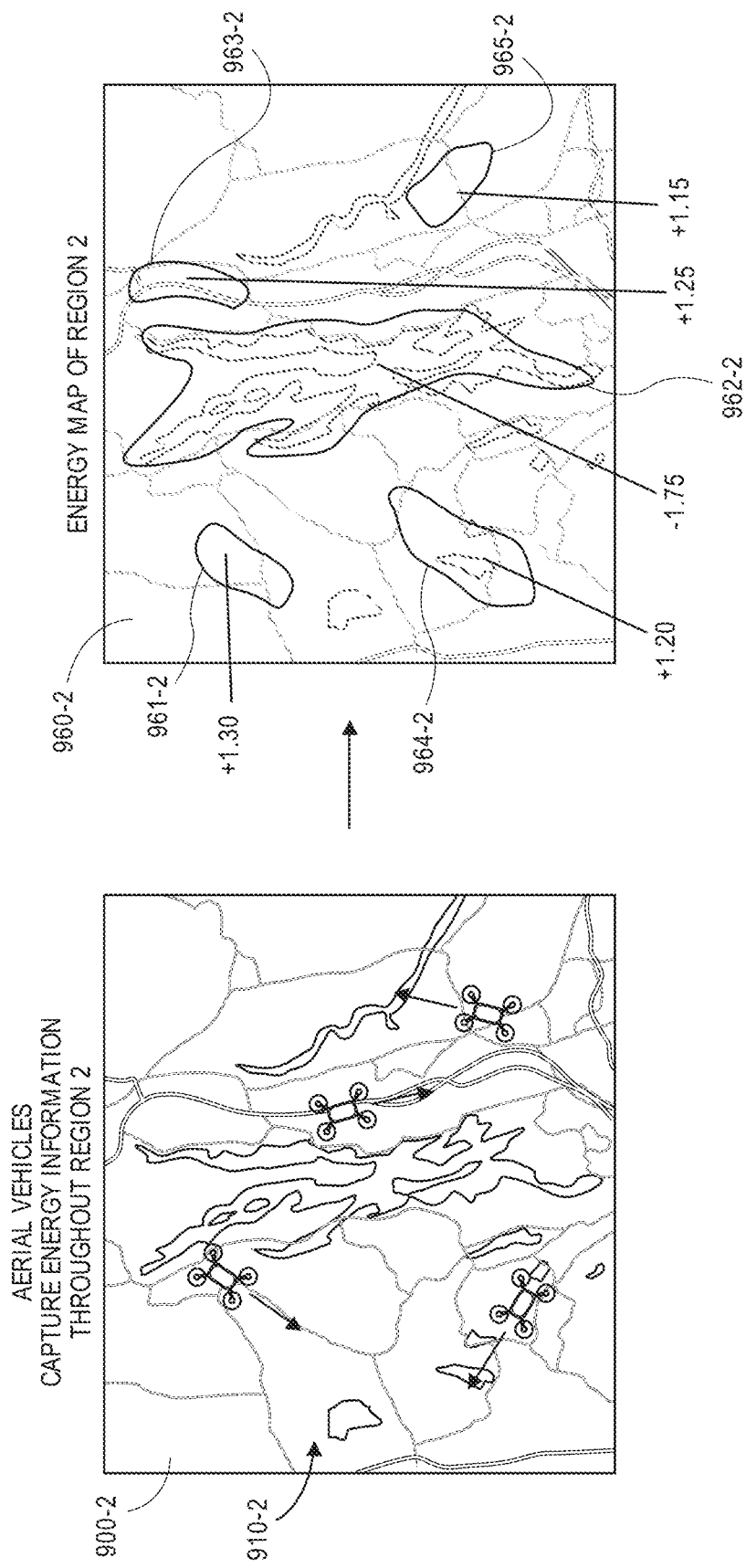

Similarly, as is shown in FIG. 9B, one or more aerial vehicles 910-2 capture energy information while traveling throughout a region 900-2. Using the captured information, total energy levels of the aerial vehicles 910-2 may be calculated, and an energy map 960-2 of the region 900-2 may be generated based on locations of increases or decreases in total energy levels within the region 900-2. As is shown in FIG. 9B, the energy map 960-2 includes a plurality of areas or sectors 961-2, 963-2, 964-2, 965-2 where energy surpluses are present within the region 900-2, and an area or sectors 962-2 where an energy deficit is present within the region 900-2.

Figure 9C:
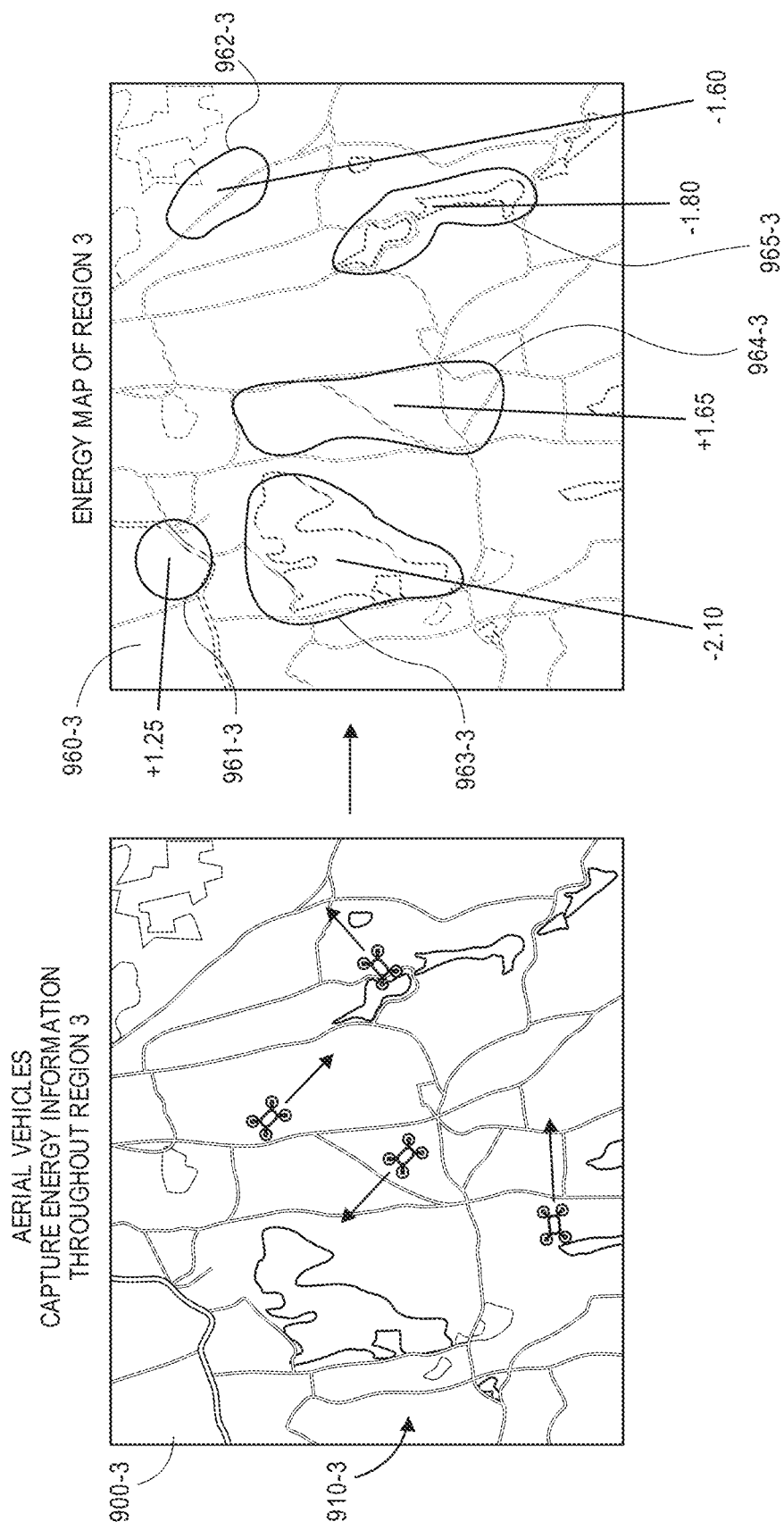

As is shown in FIG. 9C, one or more aerial vehicles 910-3 capture energy information while traveling throughout a region 900-3. Using the captured information, total energy levels of the aerial vehicles 910-3 may be calculated, and an energy map 960-3 of the region 900-3 may be generated based on locations of increases or decreases in total energy levels within the region 900-3. As is shown in FIG. 9C, the energy map 960-3 includes a plurality of areas or sectors 961-3, 964-3 where energy surpluses are present within the region 900-3, and a plurality of areas or sectors 962-3, 963-3, 965-3 where energy deficits are present within the region 960-3.

Figure 9D:
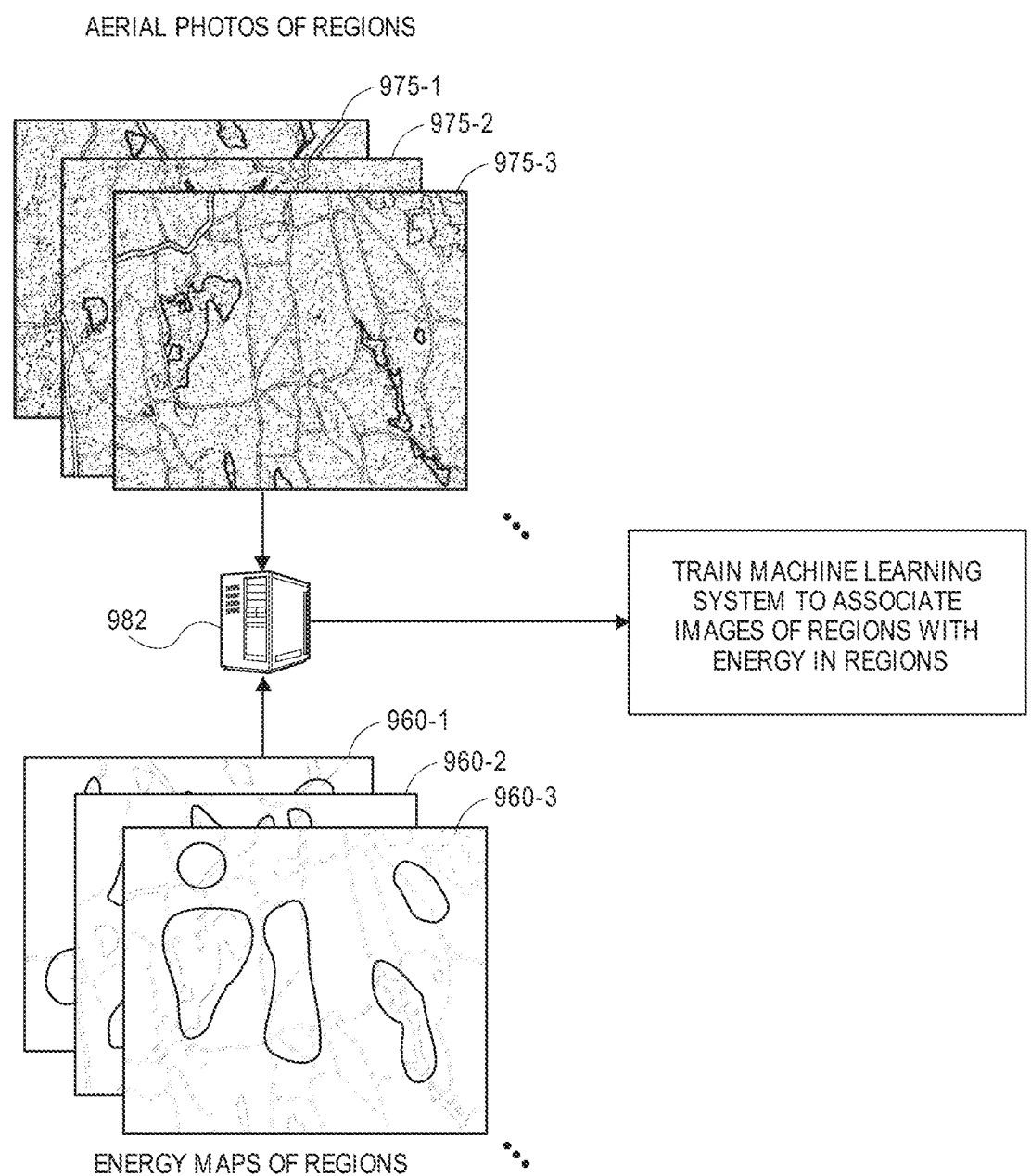

Maps or other cartographic representations of energy sources or sinks within regions and imaging data captured from above such regions may be used to train a machine learning system to associate colors, textures or other visual attributes expressed within imaging data with energy surpluses or energy deficits. As is shown in FIG. 9D, a training set including at least the energy maps 960-1, 960-2, 960-3 generated for the regions 900-1, 900-2, 900-3 as shown in FIGS. 9A through 9C, and aerial photographs 975-1, 975-2, 975-3 of the regions 900-1, 900-2, 900-3, is provided to one or more machine learning systems, e.g., artificial neural networks, operating on a server 982. In some embodiments, an artificial neural network may have any number of layers, including an input layer, an output layer, and any number of intervening hidden layers, and may be trained to map inputted data (e.g., imaging data expressed in the aerial photographs 975-1, 975-2, 975-3 of the training set) to desired outputs (e.g., the areas or sectors expressed in the energy maps 960-1, 960-2, 960-3 of the training set) by adjusting strengths of connections between one or more neurons, or synaptic weights. For example, each of the neurons in a layer within an artificial neural network may receive an input and generate an output in accordance with an activation or energy function, with parameters corresponding to the various strengths or synaptic weights. In some embodiments, an artificial neural network for generating maps or other cartographic representations of energy sources or sinks based on imaging data may be a feedforward neural network, a recurrent neural network, or any other type or category of neural network (e.g., fully or partially connected neural network).

Figure 9E:
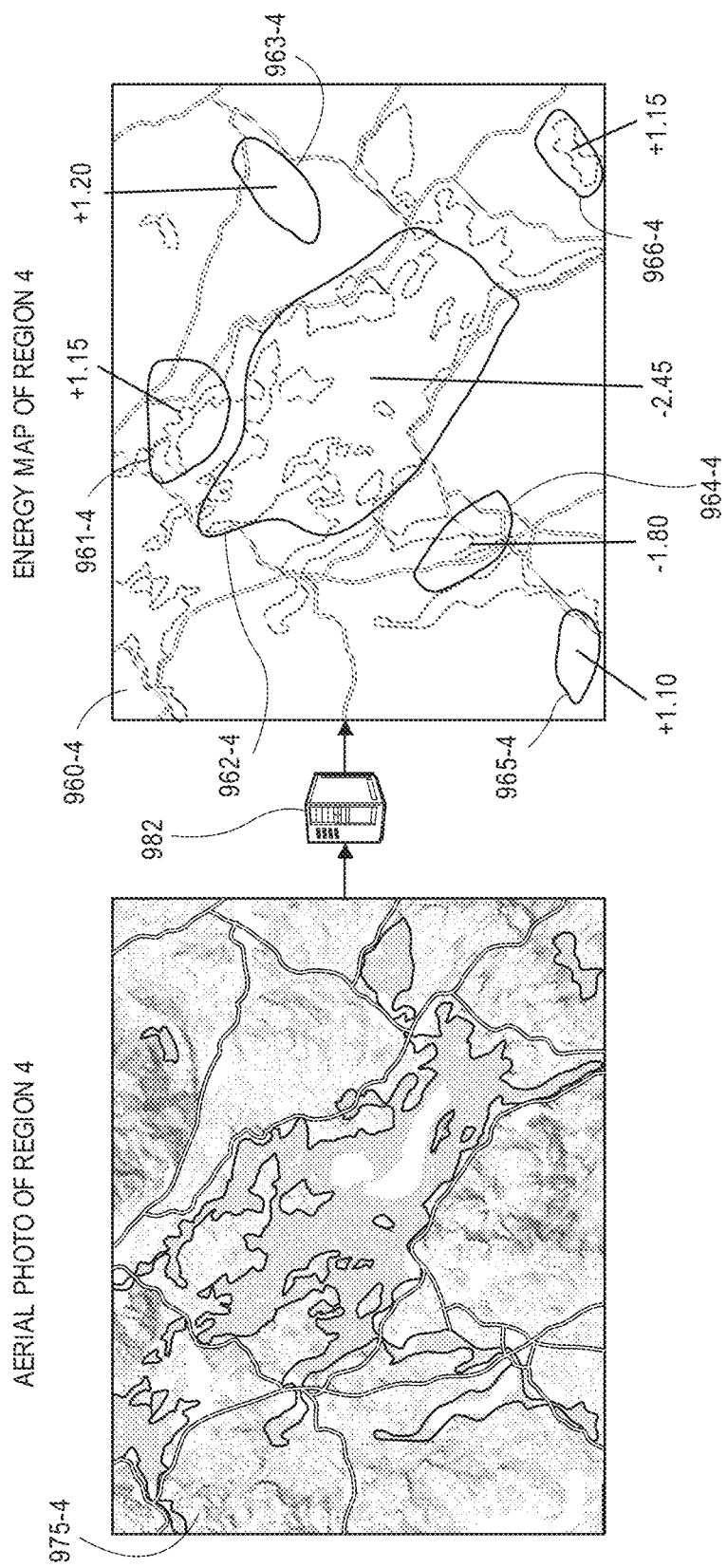

As is shown in FIG. 9E, after a machine learning system operating on the server 982 has been sufficiently trained, an aerial photograph 975-4 of a region 900-4 is provided as an input to the trained machine learning system, and an energy map 960-4 of the region 900-4 is generated based on an output received from the trained machine learning system. The energy map 960-4 may be utilized to identify one or more areas or sectors within the region 900-4 where energy surpluses are available, and areas or sectors within the region 900-4 where energy deficits are available, or for any other purpose, e.g., to select one or more routes within the region 900-4 for performing one or more missions.

Although the disclosure has been described herein using exemplary techniques, components, and/or processes for implementing the systems and methods of the present disclosure, it should be understood by those skilled in the art that other techniques, components, and/or processes or other combinations and sequences of the techniques, components, and/or processes described herein may be used or performed that achieve the same function(s) and/or result(s) described herein and which are included within the scope of the present disclosure.

It should be understood that, unless otherwise explicitly or implicitly indicated herein, any of the features, characteristics, alternatives or modifications described regarding a particular embodiment herein may also be applied, used, or incorporated with any other embodiment described herein, and that the drawings and detailed description of the present disclosure are intended to cover all modifications, equivalents and alternatives to the various embodiments as defined by the appended claims. Moreover, with respect to the one or more methods or processes of the present disclosure described herein, including but not limited to the processes represented in the flow charts of FIG. 3, 6 or 8, orders in which such methods or processes are presented are not intended to be construed as any limitation on the claimed inventions, and any number of the method or process steps or boxes described herein can be combined in any order and/or in parallel to implement the methods or processes described herein. Also, the drawings herein are not drawn to scale. In particular, the one or more maps or other cartographic representations of energy levels are not drawn to scale.

Conditional language, such as, among others, "can," "could," "might," or "may," unless specifically stated otherwise, or otherwise understood within the context as used, is generally intended to convey in a permissive manner that certain embodiments could include, or have the potential to include, but do not mandate or require, certain features, elements and/or steps. In a similar manner, terms such as "include," "including" and "includes" are generally intended to mean "including, but not limited to." Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Disjunctive language such as the phrase "at least one of X, Y, or Z," or "at least one of X, Y and Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

Language of degree used herein, such as the terms "about," "approximately," "generally," "nearly" or "substantially" as used herein, represent a value, amount, or characteristic close to the stated value, amount, or characteristic that still performs a desired function or achieves a desired result. For example, the terms "about," "approximately," "generally," "nearly" or "substantially" may refer to an amount that is within less than 10% of, within less than 5% of, within less than 1% of, within less than 0.1% of, and within less than 0.01% of the stated amount.

Although the invention has been described and illustrated with respect to illustrative embodiments thereof, the foregoing and various other additions and omissions may be made therein and thereto without departing from the spirit and scope of the present disclosure.

What is claimed is:

1. An aerial vehicle comprising:
an airspeed sensor;
an altimeter;
a position sensor;
a thermometer;
at least one propulsion motor; and
a control system having at least one computer processor, wherein the control system is in communication with each of the airspeed sensor, the altimeter, the position sensor, the thermometer, and the at least one propulsion motor, and wherein the control system is configured to execute a method comprising:

determining a first airspeed of the aerial vehicle at a first time, wherein the at least one propulsion motor is operating at a first power level at the first time;

determining a first altitude above a first ground-based location of the aerial vehicle at the first time;

determining a first temperature of air at the first altitude above the first ground-based location at the first time;

determining that the aerial vehicle is at a second altitude at a second time;

in response to determining that the aerial vehicle is at the second altitude at the second time, determining a second airspeed of the aerial vehicle at the second time, wherein the at least one propulsion motor is operating at a second power level at the second time;

determining a second altitude above a second ground-based location of the aerial vehicle at the second time;

determining a second temperature of air at the second altitude above the second ground-based location at the second time;

calculating a first energy level of the aerial vehicle at the first time based at least in part on at least one of:

a product of one-half of a mass of the aerial vehicle and a square of the first airspeed;

a product of the mass of the aerial vehicle, an acceleration constant due to gravity and the first altitude; and the first power level;

calculating a second energy level of the aerial vehicle at the second time based at least in part on at least one of:

a product of one-half of the mass of the aerial vehicle and a square of the second airspeed;

a product of the mass of the aerial vehicle, the acceleration constant due to gravity and the second altitude; and the second power level;

determining a difference between the first energy level and the second energy level;

attributing the difference between the first energy level and the second energy level to a difference between the first temperature and the second temperature;

generating a map of at least a portion of a region including at least the second ground-based location, wherein the map comprises an indicator of naturally present energy at the second ground-based location; and storing at least the map of at least the portion of the region in at least one data store, wherein the indicator identifies a natural energy source associated with the second ground-based location if the second energy level exceeds the first energy level, and wherein the indicator identifies a natural energy sink associated with the second ground-based location if the second energy level does not exceed the first energy level.

2. The aerial vehicle of claim 1, wherein the method further comprises:

identifying information regarding a mission to be performed by the aerial vehicle, wherein the mission requires travel from an origin within the region to a destination within the region;

selecting at least one of a path or a waypoint based at least in part on the map; and generating a route for performing the mission, wherein the route comprises the origin, the at least one of the path or the waypoint, and the destination.

3. The aerial vehicle of claim 1, further comprising an imaging device, wherein the method further comprises:

capturing an aerial photograph of the region;

defining a training set comprising the aerial photograph of the region as at least one training input and the map of the region as at least one training output;

training a machine learning system executed by at least one processor to associate at least one portion of an image of a region with naturally present energy in the region based at least in part on the training set;

identifying an aerial photograph of another region;

providing the aerial photograph of the other region to the trained machine learning system as an input;

receiving an output from the trained machine learning system; and generating a map of the other region, wherein the map of the other region comprises an indicator of naturally present energy associated with at least one ground-based location of the other region.

4. A computer-implemented method comprising:

calculating a first energy level of a first aerial vehicle at a first time, wherein the first energy level is calculated based at least in part on a first airspeed of the first aerial vehicle at the first time and a first altitude of the first aerial vehicle above a first ground-based location at the first time;

determining a first temperature of air at the first altitude above the first ground-based location;

determining that the first aerial vehicle is at a second altitude above a second ground-based location at a second time, wherein the second time follows the first time;

determining a second airspeed of the first aerial vehicle at the second time;

calculating a second energy level of the first aerial vehicle at the second time based at least in part on the second altitude and the second airspeed;

calculating a difference between the second energy level and the first energy level;

determining a second temperature of air at the second altitude above the second ground-based location;

attributing the difference between the second energy level and the first energy level to naturally present energy at the second ground-based location based at least in part on a difference between the second temperature and the first temperature; and storing an indication of the naturally present energy associated with the second ground-based location at the second time in at least one data store, wherein the indication identifies a natural energy source associated with the second ground-based location if the second energy level exceeds the first energy level, and wherein the indication identifies a natural energy sink associated with the second ground-based location if the second energy level does not exceed the first energy level.

5. The computer-implemented method of claim 4, further comprising:
generating a map of a first region including at least the second ground-based location, wherein the map of the first region comprises the indication of the naturally present energy at the second ground-based location at the second time; and
storing the map of the first region in the at least one data store.

6. The computer-implemented method of claim 5, wherein generating the map of the first region comprises:
determining a mass of the first aerial vehicle;
determining a specific energy level associated with the second ground-based location at the second time, wherein determining the specific energy level comprises dividing the difference between the second energy level and the first energy level by the mass of the first aerial vehicle; and
storing the specific energy level in association with the second ground-based location at the second time in the at least one data store.

7. The computer-implemented method of claim 5, further comprising:
identifying a first aerial photograph of the first region;
defining a training set comprising the first aerial photograph of the first region as at least one training input and the map of the first region as at least one training output;
training a machine learning system executed by at least one processor to associate at least one portion of an image with naturally present energy based at least in part on the training set;
identifying a second aerial photograph of a second region captured at a third time;
providing the second aerial photograph to the trained machine learning system as a first input;
receiving a second output from the trained machine learning system; and
generating a map of the second region based at least in part on the second output, wherein the map of the second region comprises an indication of naturally present energy associated with at least one ground-based location of the second region at the third time; and
storing the map of the second region in the at least one data store.

8. The computer-implemented method of claim 7, wherein the at least one machine learning system is an artificial neural network comprising an input layer of one or more neurons, an output layer of one or more neurons, and one or more intervening hidden layers,
wherein each of the hidden layers comprises one or more neurons, and
wherein training the machine learning system comprises:
adjusting at least one synaptic weight between at least one pair of neurons based at least in part on a portion of the first aerial photograph corresponding to the second ground-based location at the second time and the difference between the second energy level and the first energy level.

9. The computer-implemented method of claim 7, wherein the at least one computer processor resides aboard the first aerial vehicle or in at least one computer system external to the first aerial vehicle.

10. The computer-implemented method of claim 5, further comprising:
identifying a mission to be performed by one of the first aerial vehicle or a second aerial vehicle, wherein the mission requires travel from an origin within the first region to a destination within the first region; and
selecting a route for performing the mission based at least in part on the map of the first region, wherein the selected route comprises at least one waypoint corresponding to the second ground-based location.

11. The computer-implemented method of claim 10, wherein selecting the route for performing the mission comprises:
identifying a plurality of routes between the origin within the first region and the destination within the first region; and
determining, based at least in part on the map of the first region, an amount of energy to be consumed by the one of the first aerial vehicle or the second aerial vehicle in traveling along one of the routes,
wherein the route for performing the mission is selected based at least in part on the amounts of energy to be consumed by the one of the first aerial vehicle or the second aerial vehicle in traveling along one of the routes.

12. The computer-implemented method of claim 4, wherein the first aerial vehicle comprises:
an altimeter;
at least one propulsion motor;
a thermometer;
a position sensor; and
a control system in communication with at least one of the altimeter, the at least one propulsion motor and the position sensor.

13. The computer-implemented method of claim 4, wherein the second ground-based location corresponds to at least one of:
a body of water;
a water course;
a roadway;
a structure; or
a mass of terrain, and
wherein the indication identifies one of the natural energy source or the natural energy sink as associated with the at least one of the body of water, the water course, the roadway, the structure or the mass of terrain.

14. The computer-implemented method of claim 4, wherein calculating the second energy level of the first aerial vehicle at the second time comprises:
calculating a kinetic energy level of the first aerial vehicle at the second time, wherein the kinetic energy level is equal to one half of a product of a mass of the first aerial vehicle and a square of the second airspeed;
calculating a potential energy level of the first aerial vehicle at the second time, wherein the potential energy level is equal to a product of the mass of the aerial vehicle, acceleration constant due to gravity, and the second altitude;
determining a level of work provided by at least one propulsion motor of the first aerial vehicle at the second time; and
subtracting the level of work from a sum of the kinetic energy level and the potential energy level,
wherein the second energy level is the sum of the kinetic energy level and the potential energy level with the level of work subtracted therefrom.

15. The computer-implemented method of claim 4, wherein the second temperature is greater than the first temperature.

16. A method comprising:
identifying a plurality of images, wherein each of the plurality of images depicts one of a plurality of regions, and wherein each of the plurality of images was captured using at least one imaging device carried aboard one of an aerial vehicle or an orbiting satellite;
identifying a plurality of maps, wherein each of the plurality of maps corresponds to one of the plurality of regions, and wherein each of the plurality of maps depicts at least one area within the one of the plurality of regions corresponding to a naturally present energy source or at least one area within the one of the plurality of regions corresponding to a naturally present energy sink within the one of the regions;
defining a training set comprising at least a subset of the plurality of images and at least a subset of the plurality of maps, wherein each of the plurality of images of the subset depicts a region corresponding to one of the plurality of maps of the subset;
training at least one machine learning system to recognize naturally present energy within a region based at least in part on imaging data depicting at least a portion of the region using at least the training set;
identifying a first image depicting at least a portion of a first region, wherein the first image was captured using an imaging device carried aboard one of an aerial vehicle or an orbiting satellite;
providing the first image to the at least one trained machine learning system as a first input;
receiving a first output from the at least one trained machine learning system in response to the first input; and
generating a first map based at least in part on the first output, wherein the first map depicts at least one of a first area within the first region corresponding to a naturally present energy source or a second area within the first region corresponding to a naturally present energy sink.

17. The method of claim 16, wherein the at least one machine learning system is an artificial neural network comprising an input layer of one or more neurons, an output layer of one or more neurons, and one or more intervening hidden layers,
wherein each of the hidden layers comprises one or more neurons, and
wherein training the at least one machine learning system comprises:
adjusting, by at least one computer processor at least one synaptic weight between at least one pair of neurons based at least in part on at least one of the subset of the plurality of images and at least one of the subset of the plurality of maps.

18. The method of claim 16, further comprising:
detecting, by each of a plurality of aerial vehicles traveling within a region, at least one change in altitude of one of the aerial vehicles;
determining, by each of the plurality of aerial vehicles, a location within the region associated with the at least one change in altitude; and
generating one of the plurality of maps based at least in part on the at least one change in altitude of each of the aerial vehicles and the location within the region of the at least one changes.

19. The method of claim 16, further comprising:
identifying a plurality of routes between an origin within the first region and a destination within the first region;
determining, based at least in part on the first map, an amount of energy to be consumed by a first aerial vehicle in traveling along each of the routes; and
selecting a route for traveling from the origin to the destination based at least in part on the first map,
wherein the route for performing the mission is selected based at least in part on the amounts of energy to be consumed by the first aerial vehicle in traveling along each of the routes.

* * * * *